United States Patent
Rodriguez-Palacios et al.

(10) Patent No.: US 12,201,082 B2
(45) Date of Patent: Jan. 21, 2025

(54) MULTILAYER, STATIC HOUSING SYSTEMS

(71) Applicant: Case Western Reserve University, Cleveland, OH (US)

(72) Inventors: Alexander Rodriguez-Palacios, Cleveland, OH (US); Fabio Cominelli, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 534 days.

(21) Appl. No.: 16/250,195

(22) Filed: Jan. 17, 2019

(65) Prior Publication Data
US 2019/0216045 A1    Jul. 18, 2019

Related U.S. Application Data

(60) Provisional application No. 62/618,256, filed on Jan. 17, 2018.

(51) Int. Cl.
*A01K 1/03*    (2006.01)
*A01K 1/00*    (2006.01)
*A01K 1/02*    (2006.01)

(52) U.S. Cl.
CPC .......... *A01K 1/031* (2013.01); *A01K 1/0047* (2013.01); *A01K 1/0058* (2013.01); *A01K 1/0245* (2013.01)

(58) Field of Classification Search
CPC .. A01K 1/0047; A01K 1/0058; A01K 1/0064; A01K 1/031; A01K 1/0245; A01K 1/0236; A01K 1/0272; A01K 1/0281; A01K 1/029; A01K 1/03
USPC .......... 119/418, 419, 493, 496, 500
See application file for complete search history.

(56) References Cited

U.S. PATENT DOCUMENTS

| | | | | |
|---|---|---|---|---|
| 3,528,390 A | * | 9/1970 | Lee ......... | A01K 1/031 156/283 |
| 3,613,639 A | * | 10/1971 | Lee ......... | A01K 1/031 119/419 |
| 3,630,174 A | * | 12/1971 | Runkle ...... | A01K 1/031 119/419 |
| 4,334,500 A | * | 6/1982 | Ziller ....... | A01K 1/0245 119/419 |
| 4,696,257 A | * | 9/1987 | Neary ....... | A01K 1/0114 119/166 |
| 4,788,939 A | * | 12/1988 | Peters ....... | A01K 1/031 119/419 |

(Continued)

FOREIGN PATENT DOCUMENTS

WO    WO-2008147224 A1 * 12/2008    ........... A01J 7/00

OTHER PUBLICATIONS

Rodriguez-Palacios, "Inflammation, Infection, and Micobiome in Cancers" Evidence, Mechanisms, and Implications, Springer, The American Physiological Society 2021, pp. 1-513.

*Primary Examiner* — Peter M Poon
*Assistant Examiner* — Danielle A Clerkley
(74) *Attorney, Agent, or Firm* — Tarolli, Sundheim, Covell & Tummino LLP

(57) ABSTRACT

One aspect of the present disclosure can include a multilayer static housing system for preventing the ingress of microorganisms therein. The housing system can include a static outer housing unit and at least one static inner housing unit nested completely inside of the outer housing unit. Airflow through the housing system can be driven passively by the chimney effect.

9 Claims, 28 Drawing Sheets

(56) References Cited

U.S. PATENT DOCUMENTS

| | | | | |
|---|---|---|---|---|
| 4,907,536 A | * | 3/1990 | Chrisler | A01K 1/0236 119/419 |
| 5,190,879 A | * | 3/1993 | Wolfe | A01K 1/0236 435/297.1 |
| 5,572,953 A | * | 11/1996 | Phelan | A01K 1/031 119/496 |
| 5,865,144 A | | 2/1999 | Semenuk et al. | |
| 6,257,171 B1 | | 7/2001 | Rivard | |
| 6,543,387 B1 | * | 4/2003 | Stein | A01K 1/0245 119/419 |
| 6,811,164 B2 | * | 11/2004 | Trogstam | B62B 3/002 280/47.35 |
| 7,467,602 B2 | * | 12/2008 | Yoshida | A01K 1/031 119/419 |
| 8,151,733 B2 | * | 4/2012 | Gabriel | A01K 1/031 119/419 |
| 2011/0132272 A1 | | 6/2011 | Gabriel et al. | |

* cited by examiner

Individual growth curves inoculated in 10-day-soiled bedding

MULTILAYER, STATIC HOUSING SYSTEMS

RELATED APPLICATION

This application claims priority to U.S. Provisional Application Ser. No. 62/618,256, filed Jan. 17, 2018, entitled "NOVEL PORTABLE GERM-FREE HOUSING SYSTEM USING NESTED ISOLATION REVEALS CYCLICAL MICROBIAL BIAS IN MOUSE MICROBIOME RESEARCH", the entirety of which is hereby incorporated by reference for all purposes.

TECHNICAL FIELD

The present disclosure relates generally to multilayer, static housing systems that prevent the ingress of microorganisms into the housing systems and, more specifically, to highly portable, nested, static animal cages and housing systems that require no mechanical ventilation, pressurization (positive ventilation) or high efficiency particulate air (HEPA) filtration.

BACKGROUND

The importance of germ-free (GF) animals as a laboratory resource has exponentially grown with our expanded understanding of the complex role of microbes in disease modulation especially in the complex context of personalized diets, microbiome variability and genetics. Although the use of GF mice in scientific publications has tripled over the last decade, GF facilities remain relatively scarce due to their high technical costs.

Although mechanically pressurized ventilation with high-efficiency particulate arresting (HEPA) filtration have existed for decades in GF multi-cage isolation systems, and more recently in individually ventilated cages, pressurized systems require anchored (non-mobile/non-transportable) infrastructure. For example, HEPA-pressurized isolators cannot be moved freely by one person through elevators or stairs due to their large footprint and combined weight with their anchored ventilation systems. When occupied with mice, transportation of such isolators cannot be risk-free either without maintaining pressurized ventilation, because the lack of positive ventilation creates gaps in sterility barriers (e.g., back-flow of room air via negative pressurization induced by motion).

SUMMARY

One aspect of the present disclosure can include a multilayer static housing system for preventing the ingress of microorganisms therein. The housing system can comprise a static outer housing unit and at least one static inner housing unit nested completely inside of the outer housing unit. Airflow through the housing system can be driven passively by the chimney effect.

Another aspect of the present disclosure can include a multilayer isolation housing system for laboratory animal care. The system can comprise a sterilized rack assembly, a plurality of static housing systems connected to the rack assembly, and a sterilized curtain that is connected to the rack assembly and sized and dimensioned to drape over at least a portion of each of the housing systems. Each of the housing systems can comprise a static outer housing unit and at least one static inner housing unit nested completely inside of the outer housing unit. Airflow through each of the housing systems can be driven passively by the chimney effect.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 7a—illustration of ventilation and air filtration in housing systems commercially available for mice, and the housing system of the present disclosure (non-HEPA air filtration occurs in inward/outward directions as air currents move by natural ventilation and external aeration). Mouse photograph, thermography demonstrates mice are a source of heat that instantly affects the temperature of the bedding material and surrounding elements via infrared rays reflectivity. Circles illustrate hottest spot near the eye (35.9° C.), and instant infrared reflection (heat radiation) that warms up surrounding surfaces (e.g., +2.9° C. on bench top; details in FIGS. 13-15c). FIG. 7b—housing system setting in ultrabarrier GF room. FIG. 7c—germ-free housing system set in biosafety cabinet housing one 40 week-old GF-mouse during a 7-day DSS experiment (day 72 in housing system). Filter lids are sealed to cage bottoms using plastic wrap. Notice the space between the cages to store materials for individualized repeated aseptic handling and weighting of mice (small orange box). FIG. 7d—comparison of naturally occurring air humidity inside heavily soiled empty GF mouse cages monitored over time in the housing system of the present application or standard single caging (housing system of the present disclosure labeled as DC for double caging in illustration, and SC for single caging; 3 cages/group). Notice that ventilation dynamics of the housing system of the present application parallel that of SC. Air humidity differences were stable for four days and noticeable immediately after soiled cages were set as the housing system of the present disclosure (y-axis, oval). FIG. 7e—effect of external aeration with a household fan on the humidity (wet weight)

of experimentally moistened soiled corncob bedding material (replicate sets A and B; without mice). Inset, actual bedding weight in grams (four replicas/cage) over time. Notice markedly improved ventilation and evaporation (bedding desiccation) in both the housing system of the present disclosure and SC. Paired-t test, 4-6-cages/4-replicas/cage.

Figure 8:
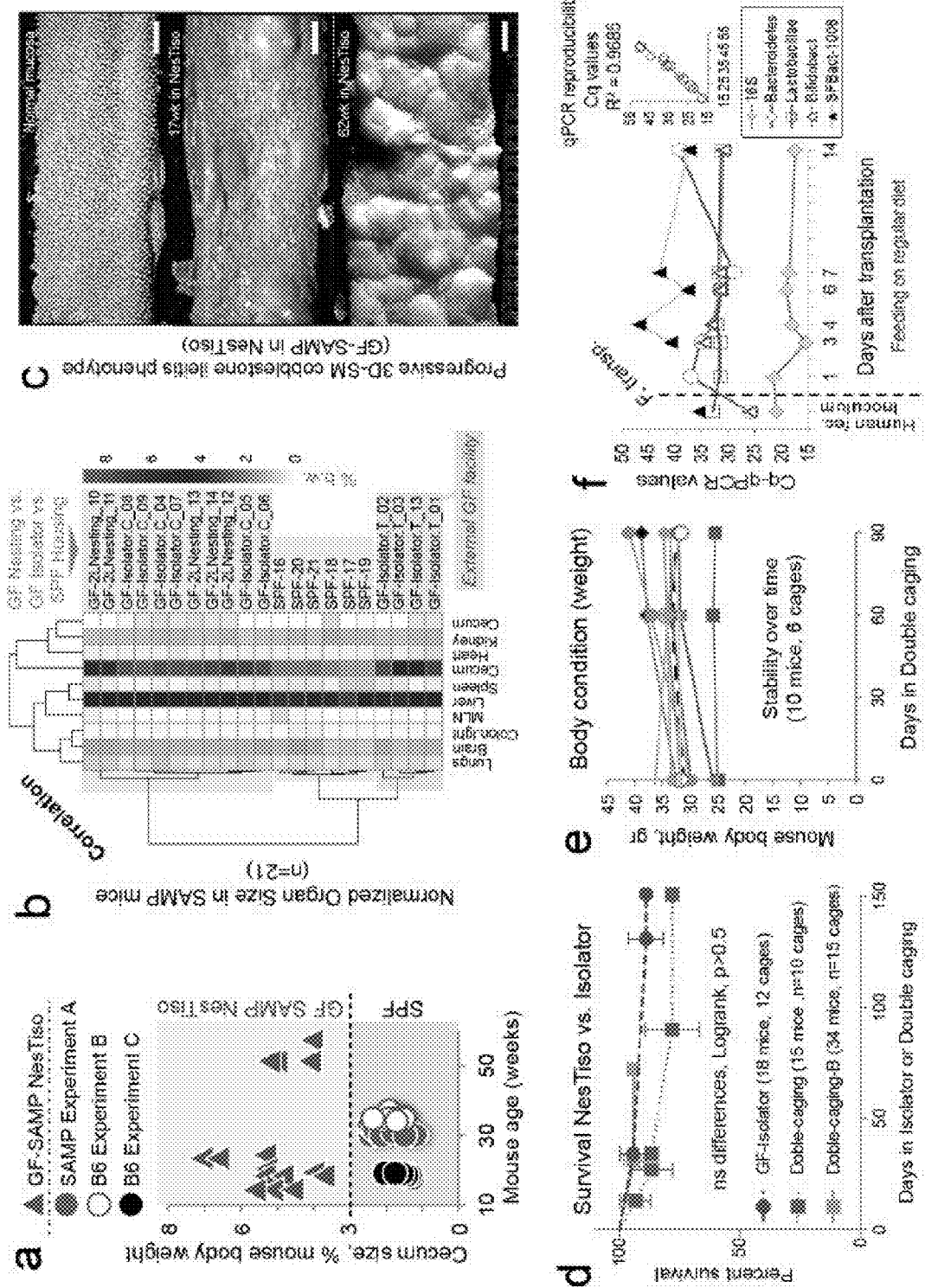

FIGS. 8a-f show that nested isolation has no negative impact on murine phenotypes. FIG. 8a—the cecum size in housing system of the present disclosure GF-SAMP mice is significantly larger compared to SPF mice, and remains unaffected across ages (curve slope~0.01, P>0.1; 3 experiments, triangles vs. circles, t-test P<0.0001, n=40). FIG. 8b—multivariable unsupervised cluster analysis of SAMP cecum and 8 other organs (normalized biomass, % of body weight) shows mice in the housing system of the present disclosure ('2LNesting') are identical to mice raised in isolators in the same facility (Isolator C). SPF and GF-isolator-T mice were included as external comparators. Mice from Isolator T (Taconic, Inc.) clustered separately due to lower cecum size after transportation. Correlation statistics predict the housing system and 'Isolator C' cluster (P<0.001, see univariate/hematocrit data in FIGS. 17a-b). FIGS. 8c—3-D-stereomicroscopic profiling of the small intestinal mucosal surface illustrates the presence and progression of typical ileitis with 'cobblestone' lesions in the housing system GF-SAMP. Scale bar, 1 mm. See histological features of cobblestone ileitis in FIGS. 17c-d). FIG. 8d—right censored survival analysis (outcome variable: time to death) shows there are no differences on mortality incidence comparing GF mice raised in isolators vs. housing system of the present disclosure. 72 and 151 day censored data (n=67 mice, >40-wks old). FIG. 8e—the housing system of the present disclosure has no negative effect on body weight as surrogate for animal welfare. Twelve week-old SAMP mice gained or maintained weight as expected while housed for additional 12 weeks in the housing system of the present disclosure (1-2 mice/cage). FIG. 8f—Quantitative 16s rRNA PCR enumeration of microbial abundance on the feces of a normal human donor and four transplanted the housing system GF SAMP mice shows relative stability of bacteria families over time (1 mouse sampled per the housing system set). Inset panel illustrates high qPCR test reproducibility. Abbreviations: Human fec., human feces; F. transplant, day of fecal transplantation; Bifidobact., bifidobacteria; SFBact-1008, segmented filamentous bacteria with 16S rRNA primer R-1008.

Figure 9:
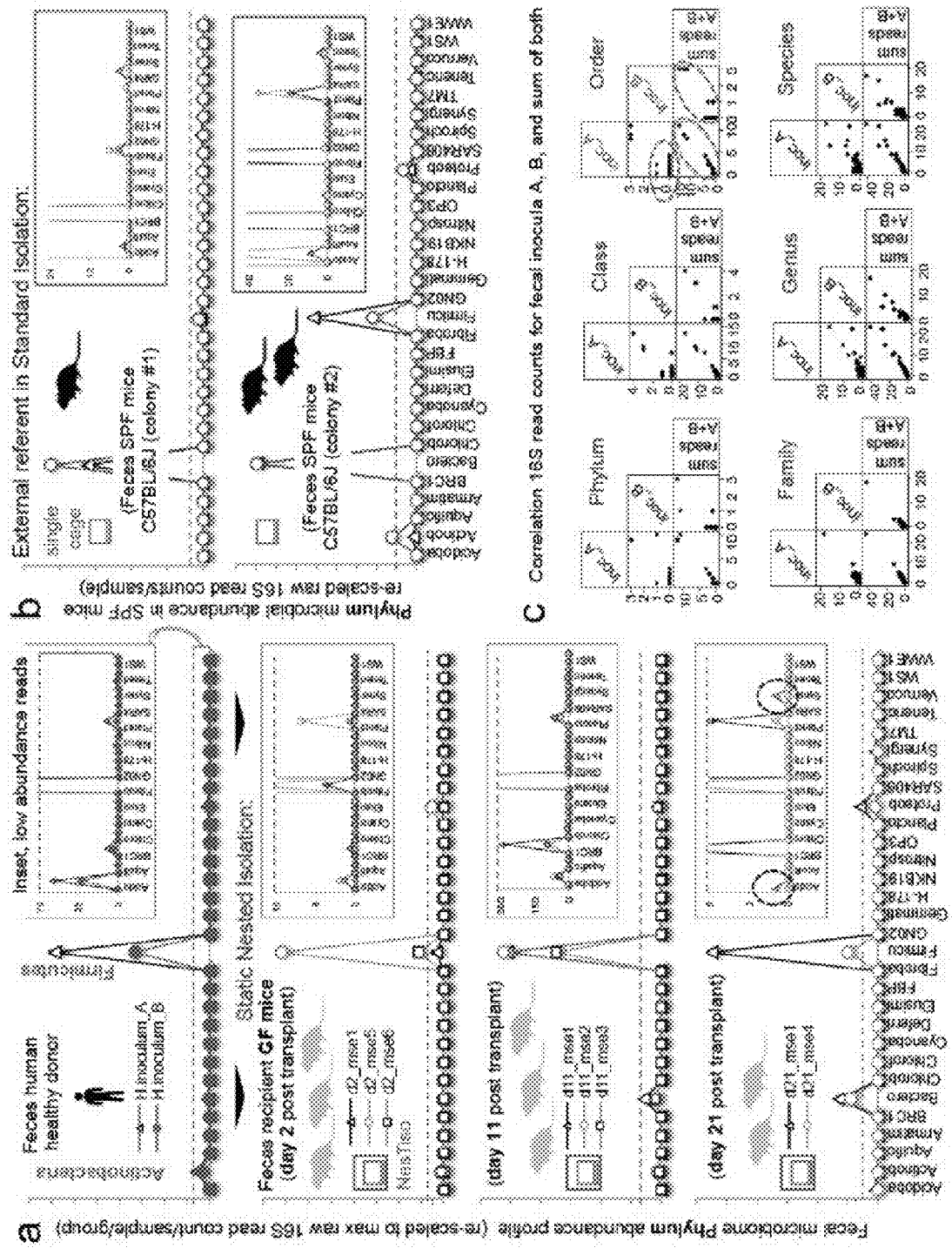
Figure 18:
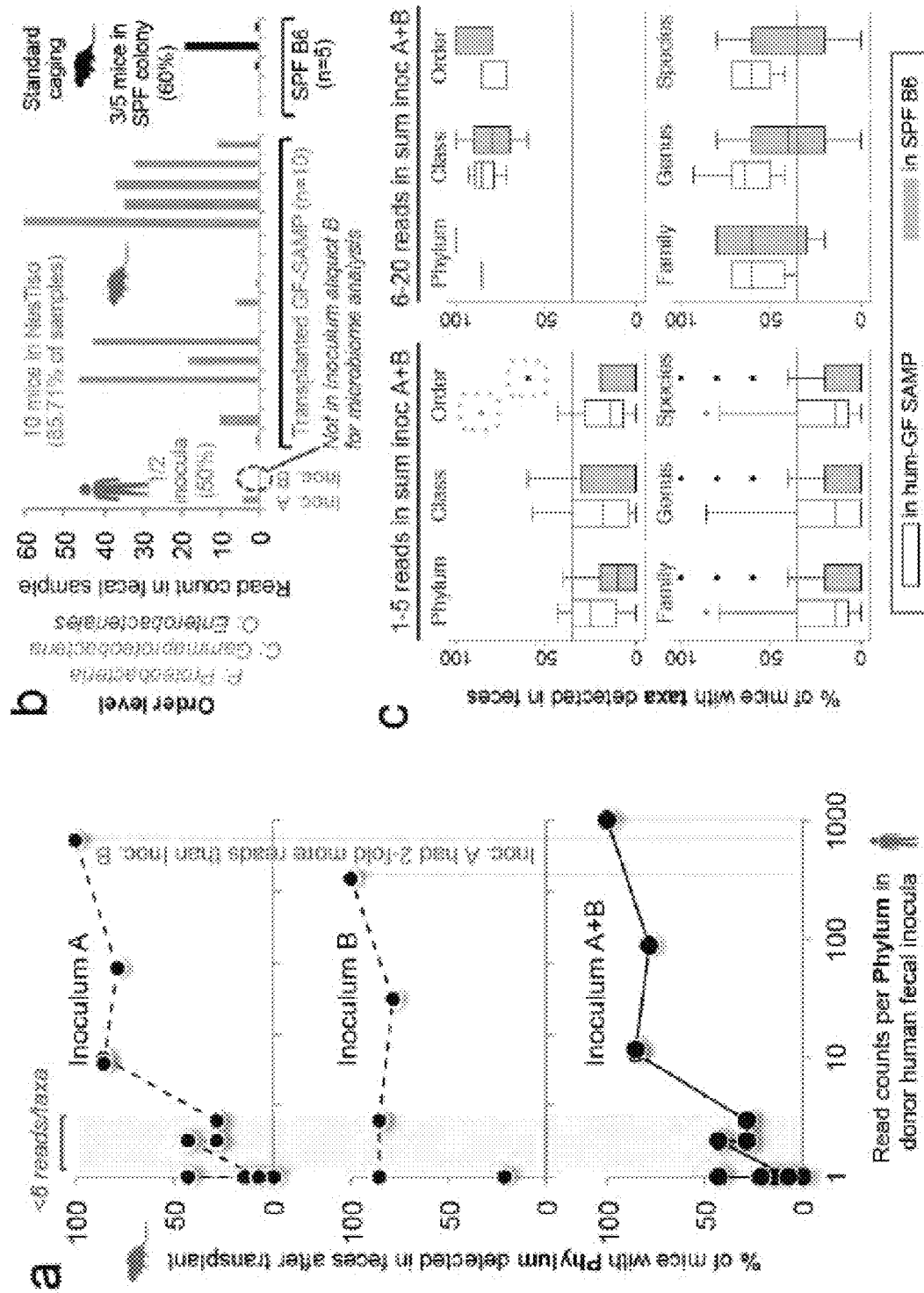

FIGS. 9a-c show fecal microbiome signatures of donor, transplanted and other mice support the housing system of the present disclosure microbe containment in BSL-2 facility. FIG. 9a—microbiome 'phylum signatures' profile for replicated samples from the feces of a normal human donor, and below, the corresponding fecal profiles of GF-SAMP mice that received the donor sample as transplant (FMT) on day 1 (10 mice transplanted; 4 the housing systems of the present disclosure sets, to diminish within-mouse repeated measures data dependency 8 collected frozen fecal samples were randomly selected for analysis, since individually ventilated cage data has earlier shown appropriate clustering over time). Normalized 16S rRNA gene (microbiome) abundance of fecal bacteria at the phylum level (Y-axis), for all 31 possible phyla in this experiment (X-axis). Notice similar quantitative Firmicutes-rich signatures of donor and FMT mice over time (binary data, 6/6 of 31 possible taxa present), suggesting FMT colonizability and stability in the housing system of the present disclosure. The slight increase in Bacteroidetes on day 21 compared to day 2 and 11 suggests natural enrichment in mice possibly due to different diet and digestive biology compared to humans. FIG. 9b—fecal microbiome phylum signatures of SPF B6 mice (used as external comparator) are richer in Bacteroidetes. Binary probability statistics (presence/absence) for all phyla observed in FMT (including low abundant phyla circled in inset plot FIG. 9a on day 21) and SPF mice, indicates that each group had unique signatures and that cage-cage cross-contamination in FMT studies is unlikely using the housing system of the present disclosure (considering the limitations of microbiome data, this data is supported by the 100% prevention of cage dissemination of microbes in the housing system of the present disclosure; see below). FIG. 9c—correlation of raw 16S rRNA gene read counts in the feces of the human donor in FIG. 9a, for two technical aliquots (A and B) to that of the sum of A+B reads (interpreted 'in series'). Notice that low abundant read data distribution improves the linearity when reads in A and B are added (see diagonal ovals in 'Order' panel; FIGS. 18a-c).

Figure 10:
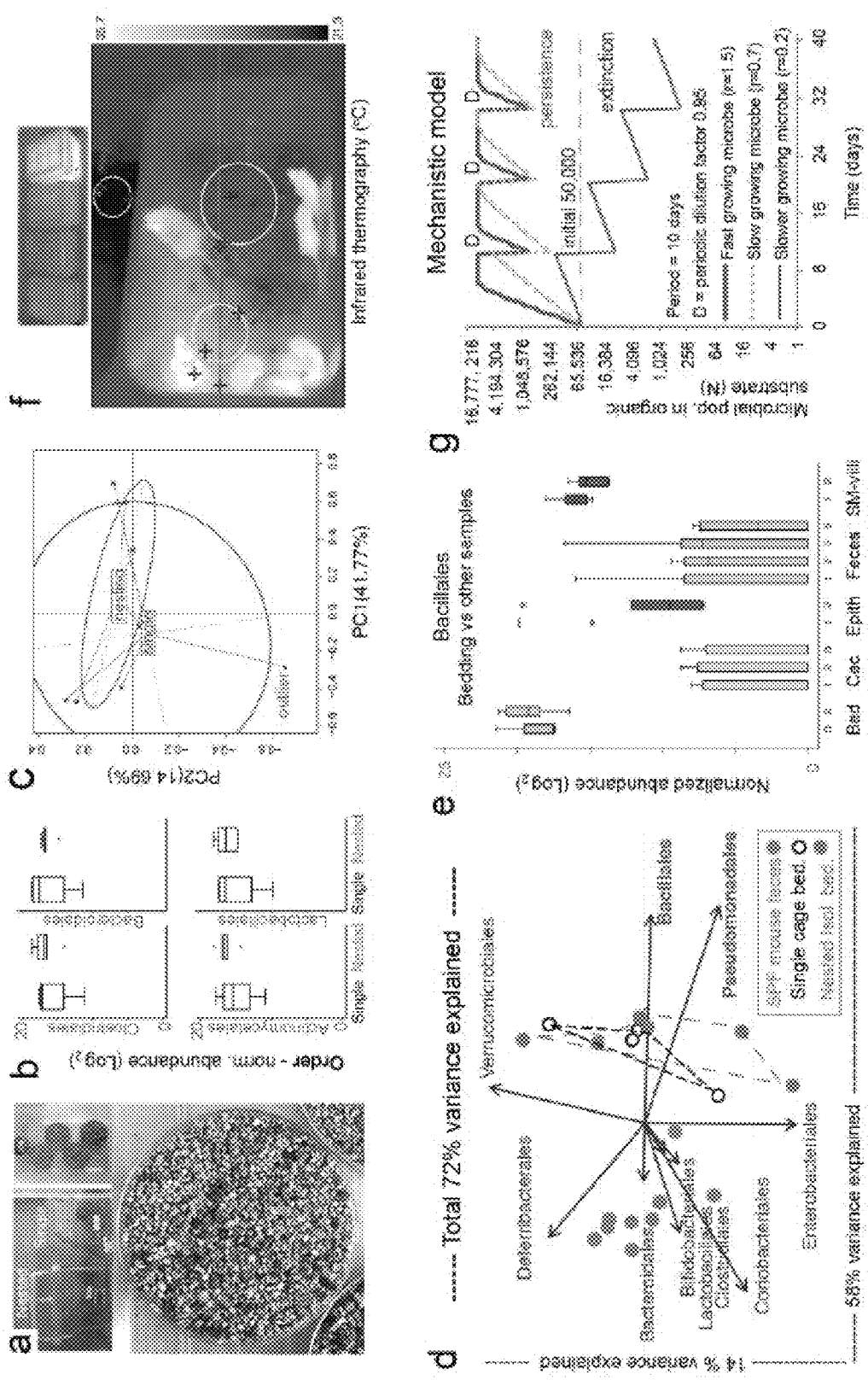

FIGS. 10a-g show the housing system of the present disclosure does not bias the fecal microbiome. FIG. 10a—split-plot experimental design to assess effect of the housing system of the present disclosure on fecal microbiome. Moist corncob bedding with SPF SAMP-mouse feces was randomly divided into Petri dishes, and incubated inside either 'Single' or 'the housing system of the present disclosure' static cages at 23° C. for 21 days (4 dishes/cage; 4 single vs. 6 the housing systems). FIG. 10b—box plots with 16S rRNA microbiome read abundance of four bacterial Orders (Clostridiales, Bacteroidales, Actinomycetales, and Lactobacillales) from pooled bedding material shows no difference between Single and the housing systems of the present disclosure after incubation (n=4 vs. 6 cages, t-test P>0.05). Notice reduced variability in the housing system of the present disclosure. FIG. 10c—multivariate principal component analysis (PCA) of 16S rRNA microbiome bacterial orders illustrate the housing system of the present disclosure does not affect the microbiome of mouse feces in bedding material compared to single caging. FIG. 10d—comparative biplot microbiome analysis of mouse bedding and fecal samples illustrates Bacillales and Pseudomonadales [and Burkholderiales in FIGS. 19a-e] as major orders enriched in bedding material independently of caging type (explaining 58% of data variance, x-axis). Clostridiales and other anaerobes in left side of biplot cannot grow aerobically. FIG. 10e—normalized box plot of mouse microbiome data from feces, cecum content, intestinal tissues and bedding samples to contextualize the comparable enrichment of Bacillales in both bedding and intestinal villous samples in mice. FIG. 10f—infrared analysis of cages housing conventional SPF-mice illustrates that the temperature in the cage bedding can be as high as 31° C. (mouse max=37.4; outside cage min=21.3), which could favor the enrichment of fast growers introducing cyclical selection bias favoring suitable aerobic microbes in mouse microbiome research. FIG. 10g—mathematical modeling and simulations over several dilution events using a mechanistic event-customizable model predicts that fecal microbial persistence or extinction in the mouse cage bedding depends on the speed of growth of each fecal microbe in the bedding over cumulative dilutional cage replacement events (set in the model as mouse bedding cage replacements every 10 days).

Figure 11A:
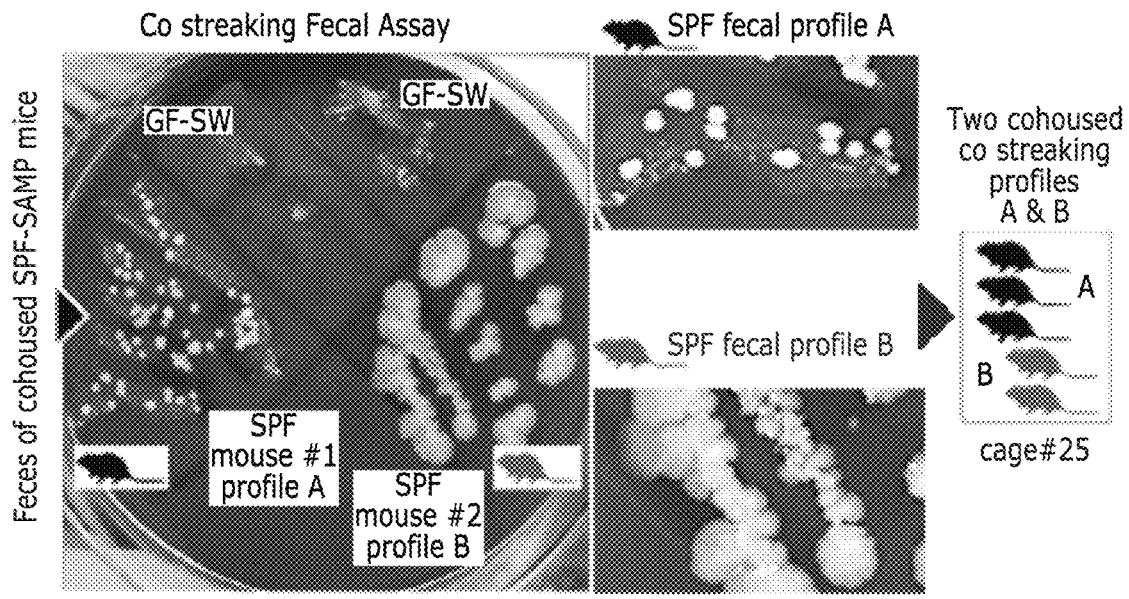
Figure 11B:
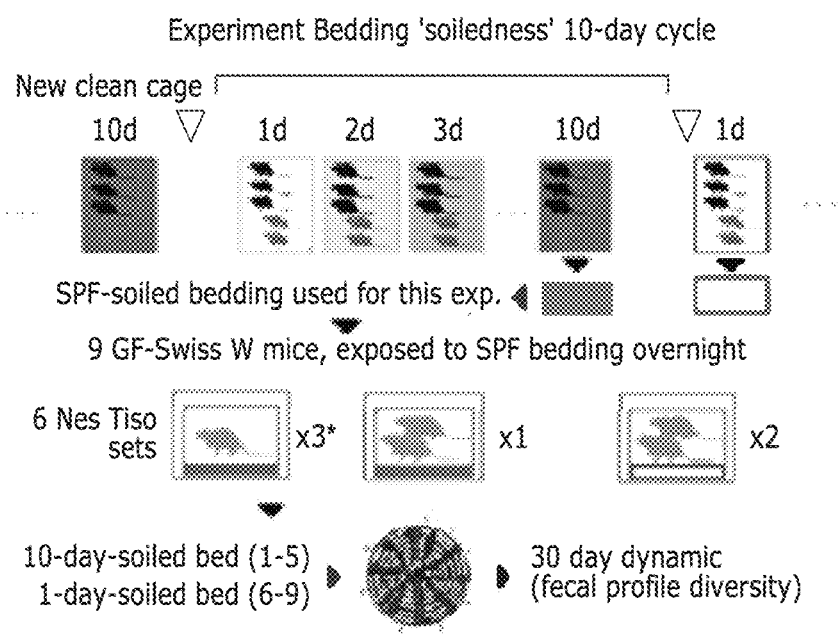
Figure 11C:
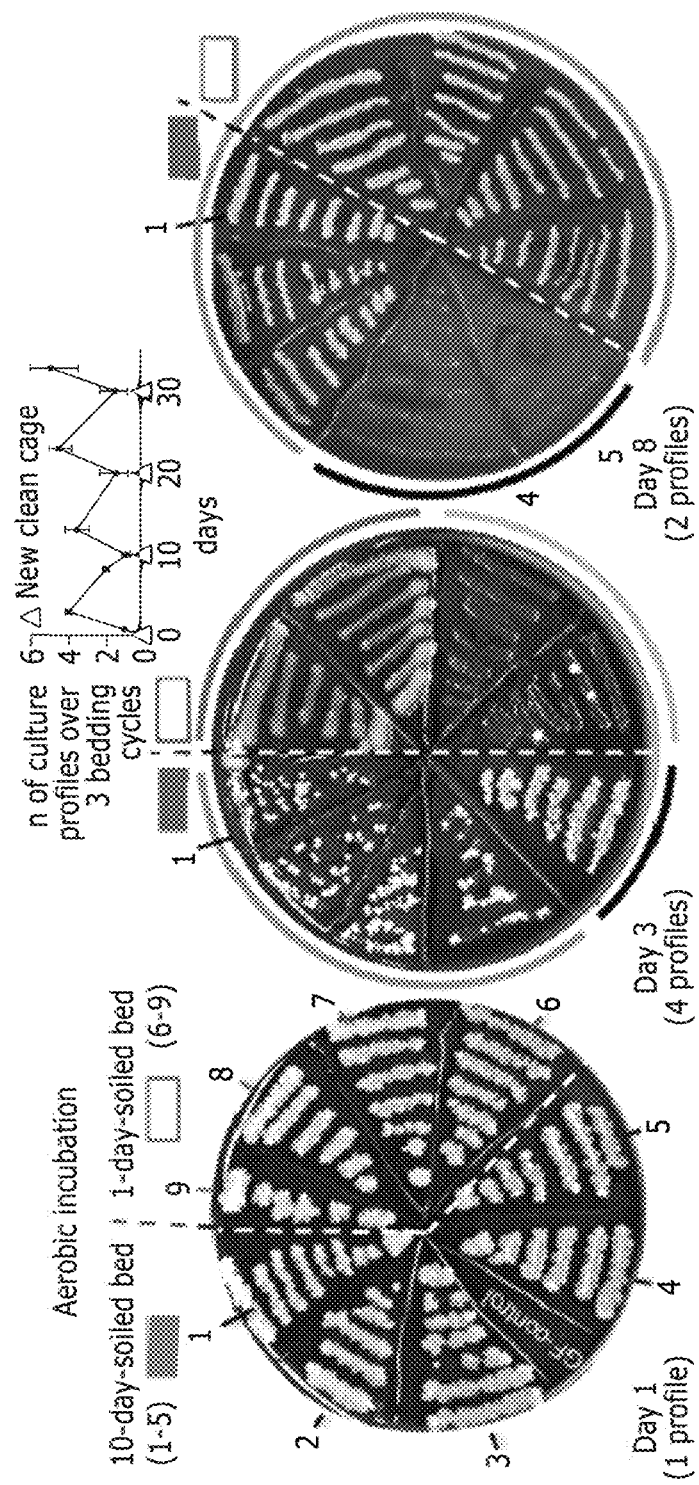
Figure 11D:
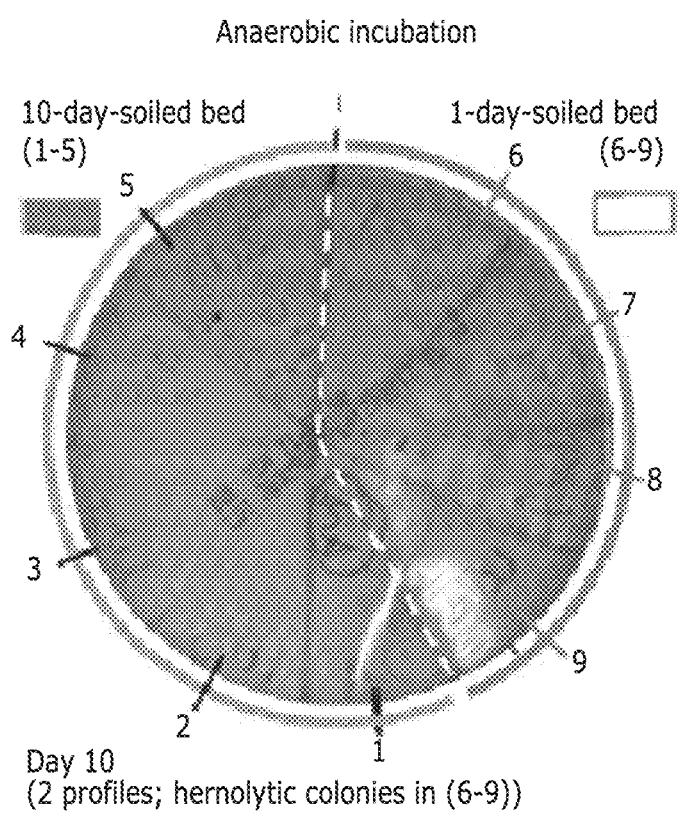

FIGS. 11a-d show exposure of GF mice to different SPF bedding "soiledness" results in distinct colonization patterns and cyclical bedding-dependent (CyBed) microbiome variability in the mouse gut. FIG. 11a—semi-quantitative fecal culture ('co-streaking') assay illustrating two distinct fecal culture profiles of five littermate SAMP mice cohoused for 20 weeks. TSA blood agar, aerobic, 37° C., 5*d*. See appearance after 36 h of incubation, and follow up gram stain of fecal smear in FIGS. 20 and 21*a*-*b*, respectively. Fecal enumeration and single-colony Sanger sequencing indicates abundant cultivable microbes contribute major fractions of bacterial DNA in mouse fecal microbiome. Under the assumption that cultivable and uncultivable microbes interact dynamically, the assay serves to monitor the comparative dynamics of fecal systems. FIG. 11*b*—experimental design to determine the effect of soiledness on colonizability differences in GF-SW mice, and the dynamic effect over three cage replacements. FIG. 11*c*—aerobic incubation of 'co-streaked' fecal samples illustrates cultivable microbiota differences. Notice 'co-streaking' fecal profiles of 9 SW mice (labels, 1-9): mice look similar on day 1; then appear more distinct with 4 cultivable profiles on day 3; then similar on day 8 (two profiles). Inset line plot, number of 'co-streaking' fecal profiles over 33 days (3 bedding cycles). Notice pattern of 'co-streaking' fecal profile variability oscillates cyclically over time with every new cage change (more alike when beddings are 10-day-soiled; more distinct when samples are collected three days in clean cages, i.e., 3-day-soiled). FIG. 11*d*—anaerobic hemolytic (virulence) fecal profiles on day 10. Notice that 4 mice exposed to 1-day soiled bedding have abundant hemolytic anaerobes (absent in 10-day-soiled bedding mice). Exposure to variably soiled bedding affect virulence profile of acquired microbes from bedding. Because microbiota abundance and virulence variation may influence animal phenotypes, it is necessary to control for CyBed microbiome variability to improve scientific rigor during experiments, but also during breeding since newborn pups from a single colony may be variably imprinted by the bedding microbiome.

Figure 12:
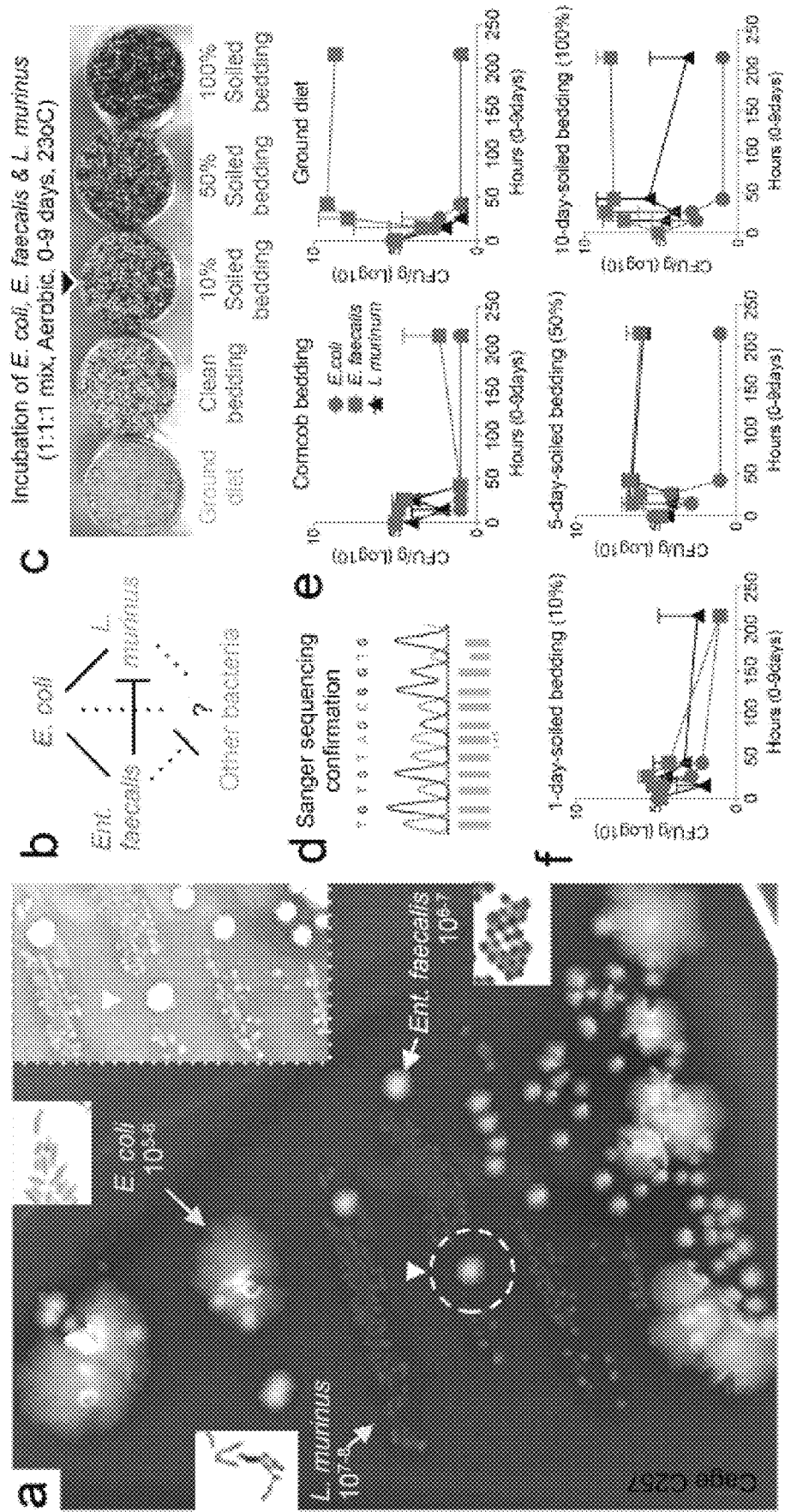
Figure 22A:
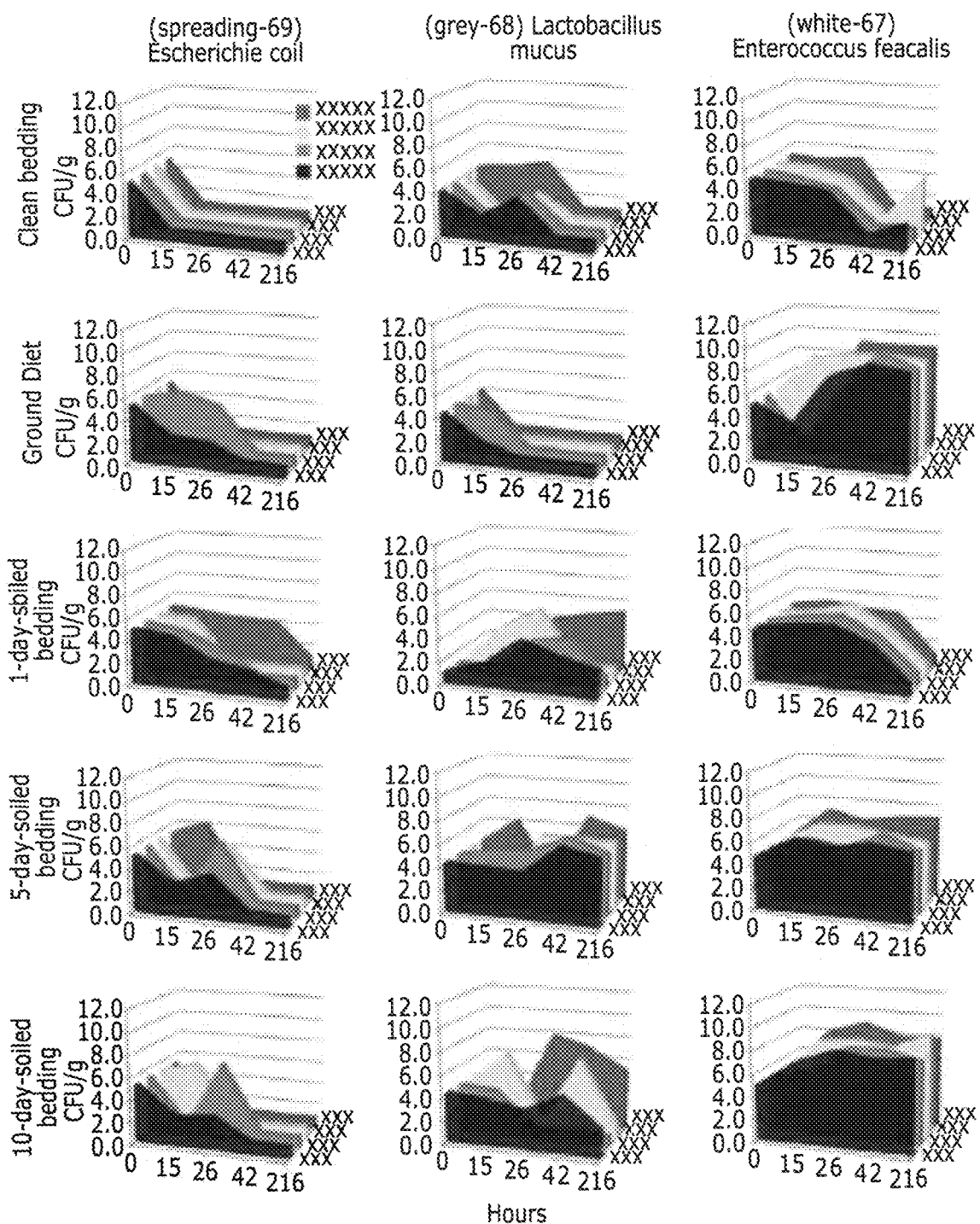
Figure 22B:
Figure 22B:
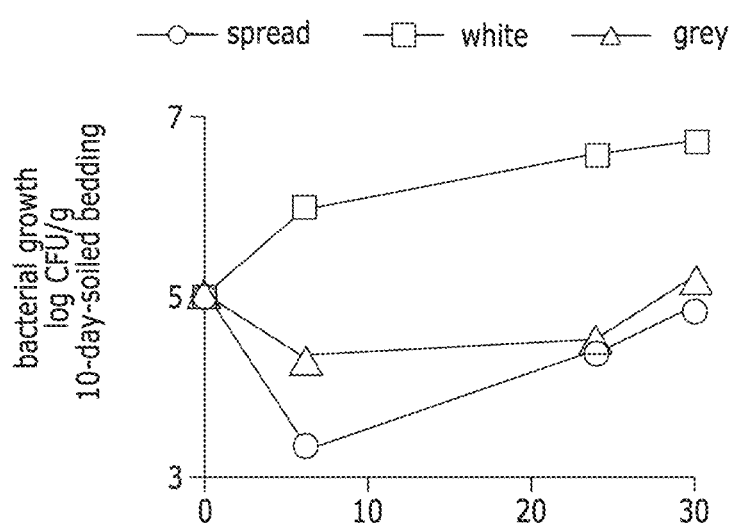

FIGS. 12*a*-*f* show in vitro growth of three abundant fecal aerobic bacteria in bedding shows *Enterococcus faecalis* resilience to soiledness. FIG. 12*a*—close up photograph of a TSA agar streaked with feces of AKR mouse after 48 h of aerobic incubation 24 h, 37° C. Notice three abundant distinct colonies (spreading, *Escherichia coli*; white, *Enterococcus faecalis*; grey, *Lactobacillus murinus*) could be semi-quantitatively ranked and compared. Notice, *E. faecalis* inhibition over *L. murinus* when in proximity (dashed circle/inset close-up). Gram-stain morphologies are shown. FIG. 12*b*—schematic of observed interactions among the selected microbes in TSA and other hypothetical uncultivable microbes. FIG. 12*c*—design of in vitro experiment to determine if a mixture of three bacteria could equally grow on bedding at different concentrations of GF-soiled bedding, clean bedding and diet. Inoculated bedding samples were incubated at 23° C. for 9 days. FIG. 12*d*—Sanger sequencing chromatograph of bacterial DNA samples from selected and enumerated isolates confirms enumeration data. FIGS. 12*e*-*f*—line plots illustrate that when incubated as a 1:1:1 mixture, *E. faecalis* is highly resilient to soiledness, and able to readily grow on the GF-grade rodent diet used. Unexpectedly, *E. coli* was the least adaptable fecal microorganism in the cage environment. Biologically and experimentally relevant, *L. murinus*, a worldwide aerobic species is best adapted to 5-day-soiled bedding, indicating selection bias favors its abundant growth until it is inhibited by the overgrowth of *E. faecalis* towards bed-day 10 (FIGS. 22*a*-*b*). Findings confirm predictions illustrated in FIG. 12*b*, which derived from interpretation of co-streaking profile.

Figure 13:
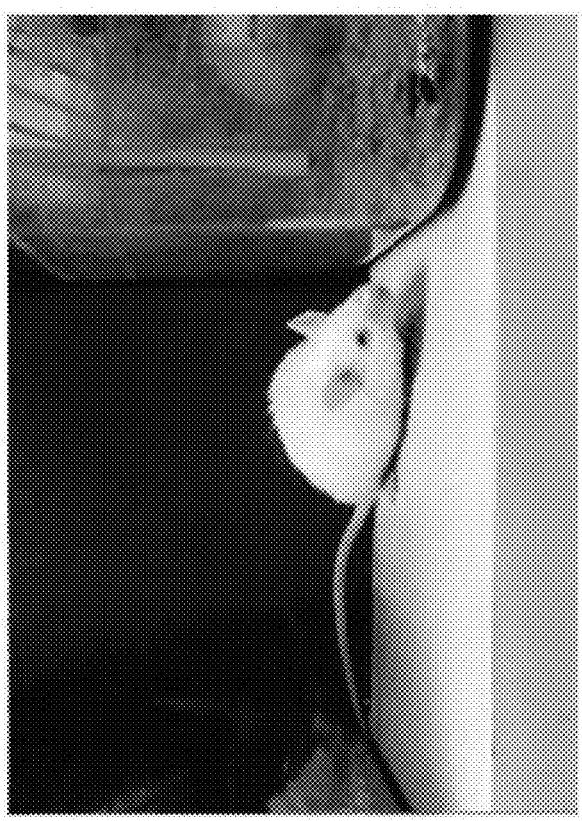
Figure 13:
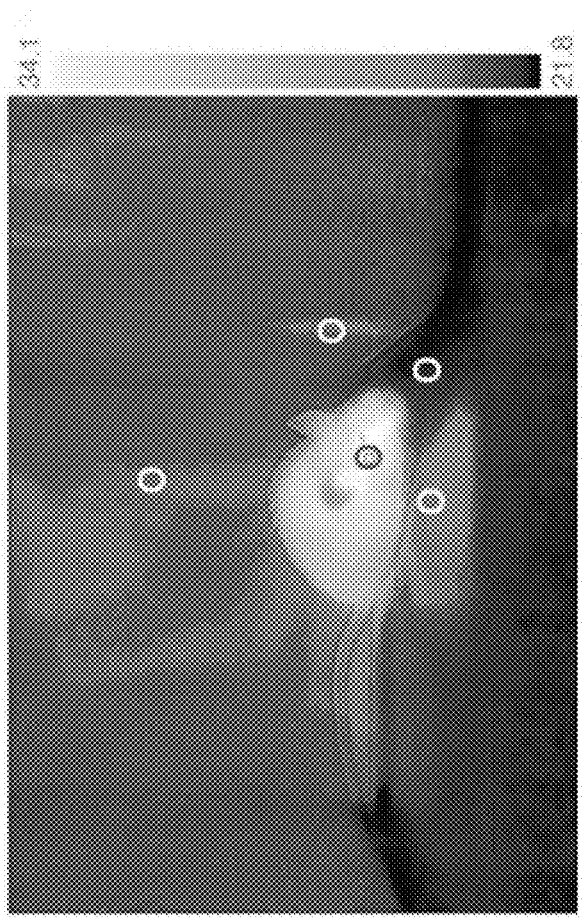

FIG. 13 shows mouse infrared heat radiation and reflectivity on different materials. Paired thermography and digital images (left and right panel, respectively) demonstrate mice are a source of heat that affects the temperature its surroundings via infrared rays reflectivity (heat radiation). Mouse is standing on a laboratory bench-top (nonreflective-to-light) surface between two rodent cages (right and left) and a paper box (in the background). Circles illustrate hottest spot near the eye (35.9° C.), and infrared reflection (25.3° C.) on the cold (22.4° C.) bench-top and cage wall (24.3° C.). Notice silhouette of heat reflection from researcher's body (located at ~1 m) on background (nonreflective-to-light) paper box (24.3° C.). Room air temperature, 23.0° C.

Figure 14A:
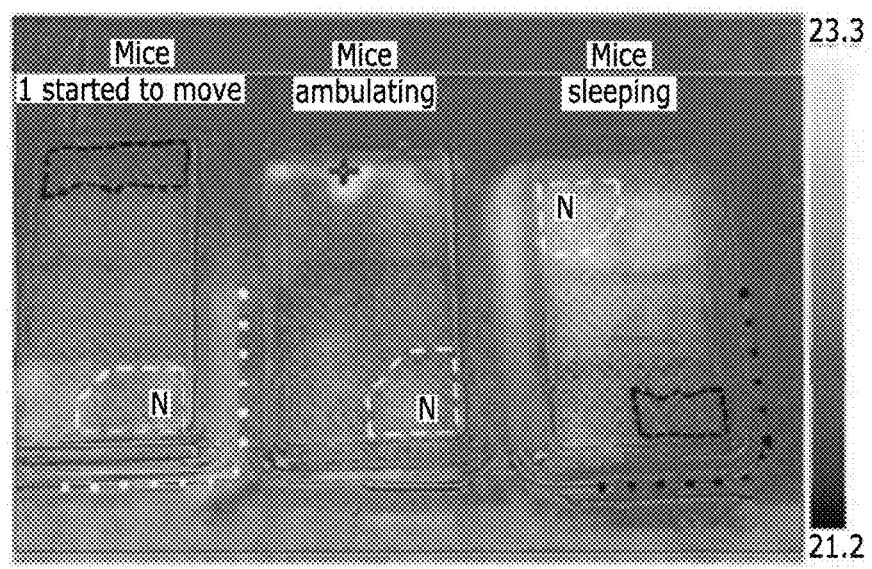
Figure 14B:
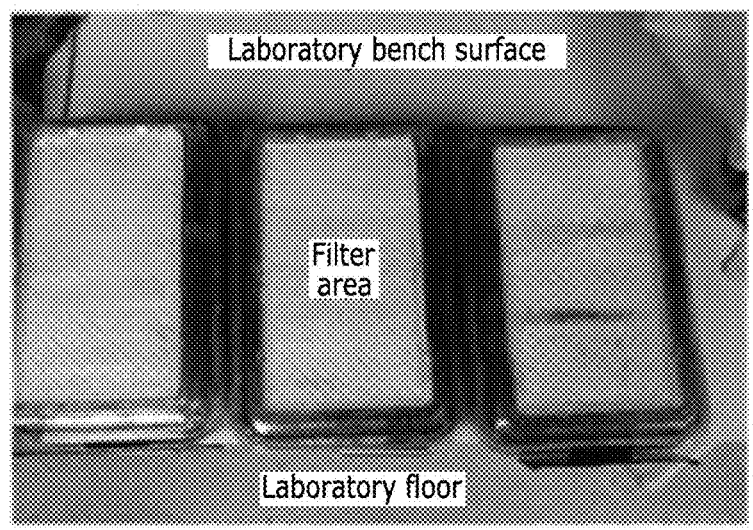
Figure 14C:
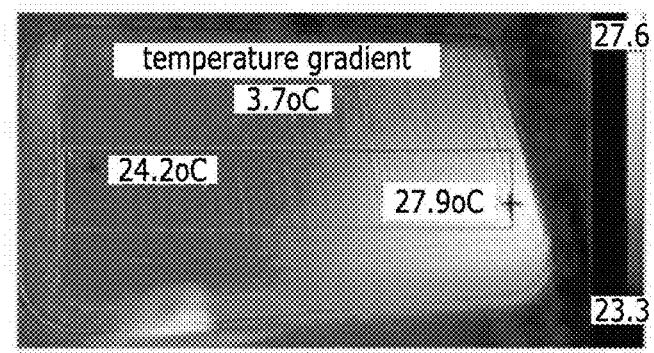
Figure 14D:
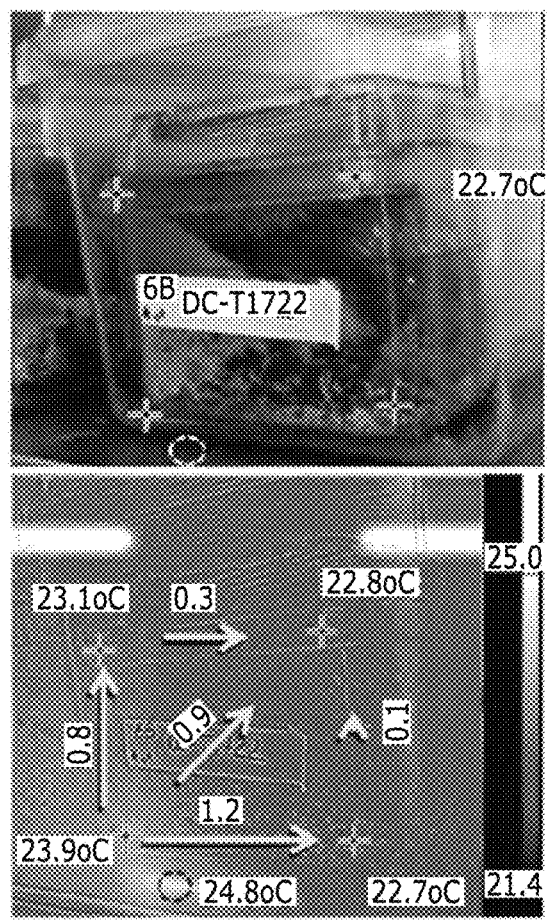
Figure 14E:
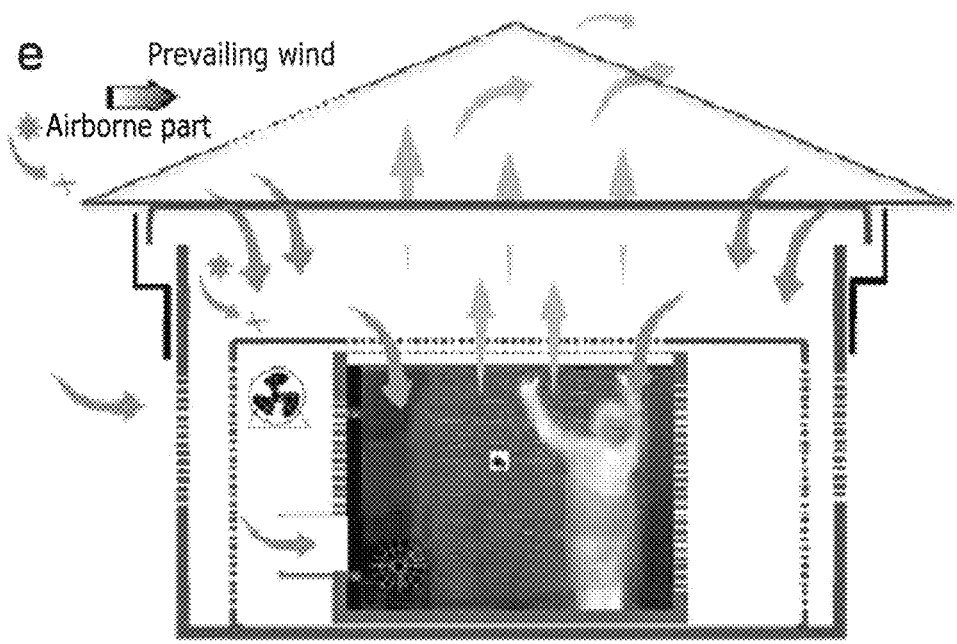

FIGS. 14*a*-*e* show movement of heat radiation, "chimney effect", and potential applications. FIGS. 14*a*-*b*—aerial view of mouse cages (filtered lids seeing from above) occupied by mice who are housed at the center of a housing system of the present disclosure. Notice the hot spots (heat radiation) on the filter lids. Mice were in a dark room sleeping in their nests. The letter N at the center of dashed areas indicates the location of the nests. Images were taken early in the morning within 2 minutes of cage transportation which made the mice to awake and move around. Quantitative thermal analysis shows the colder areas (thick dotted black polygons/lines) are opposite to the nesting site illustrating the "chimney effect" upward movement of warm air from the mice (heat source). The cage at the center has a mouse that moved out of its nest and stopped to groom on the opposite side of the cage where the hot spot is indicated by a '+' sign (hottest spot in the cage). FIG. 14*c*—thermal irradiation differential on the lid between the coldest and hottest areas is as little as 3.7° C. with two 12-week-old male GF mice sleeping on their nest (located on the right lower corner of the cage; '+', hottest spot in cage). FIG. 14*d*—thermal irradiation differential on the sidewall of the outer housing unit of the housing system. Notice that the mouse-housing cage at the center of the housing system irradiates heat that warms up the sidewalls of the outer housing unit, which illustrates temperature gradients that promote ventilation between the two nested cages in the housing system. Notice heat from the nest also increased the temperature of the metallic rack shelf, that held the housing system set overnight, in proximity to the mouse nest (the dashed circle on the metallic shelf is the image's hottest spot; '+' signs are for spatial reference. FIG. 14*e*—nested isolation/triple barrier principles could be applied to other fields of research/building engineering.

Figure 15:
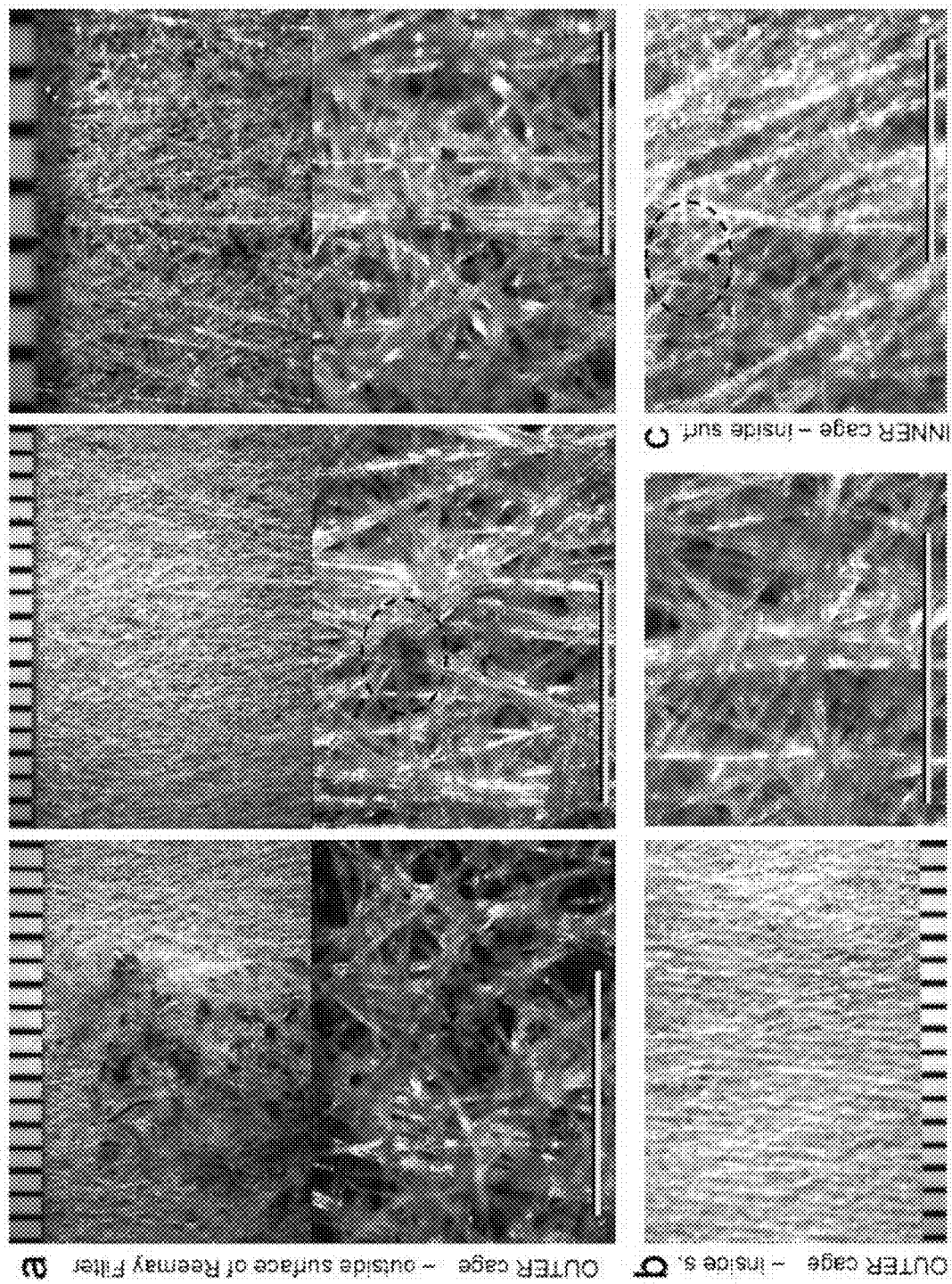

FIGS. 15*a*-*c* show close-up photographs of the cage lid filters used in certain housing systems of the present application. FIG. 15*a*—outer surface of the non-HEPA Reemay filter present in the lid of the outer cage in a housing system set left on a laboratory bench for 6 months. FIG. 15*b*—clean inside (inner) surface of the same filter depicted in FIG. 15*a*. Abbreviation, inside s., inside surface. FIG. 15*c*—soiled inside (inner) surface of the Reemay filter used in an inner cage of a housing system set that had housed GF SAMP mice that had been colonized with human fecal microbiota. Notice airborne particles at center of dashed oval. Scale bars, 1 mm. Abbreviation, inside surf., inside surface.

Figure 16:
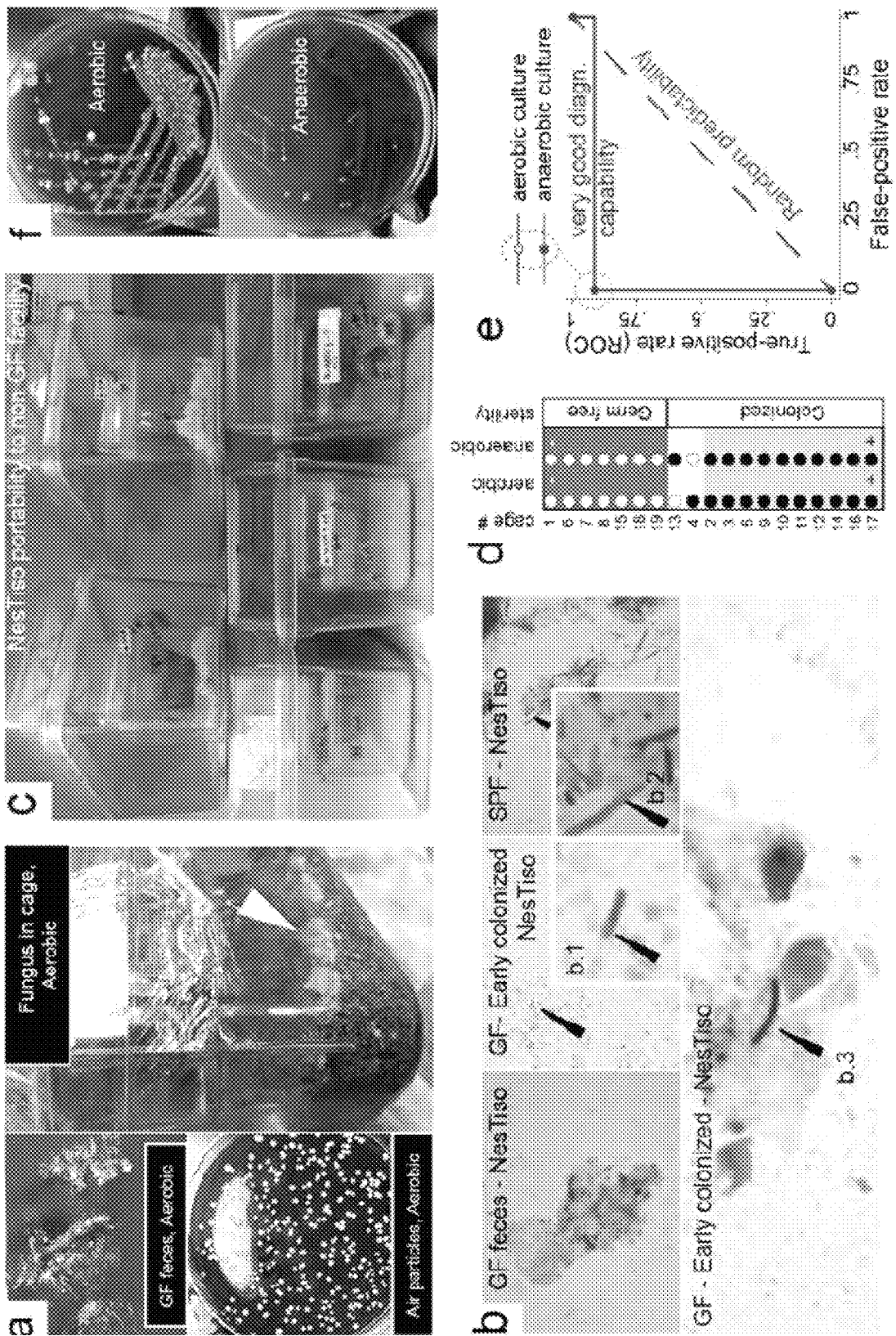

FIGS. 16*a*-*f* show microbial screening of GF mice and portability of certain housing systems of the present application. FIG. 16*a*—culture examples on TSA agar. Top left: lack of bacterial growth in 'GF feces' of mice in a housing system (37° C., 5*d* anaerobic). Bottom left: high density of bacterial colonies seeded by 'air particles' in the room air of a BSL-2 research laboratory after an agar plate was left opened for 3 h (37° C., 5 d, aerobic; relevant for data in this figure panels d-f), Right: 'fungus in cage' ('fungal trap') on surface of moist soiled bedding of a housing system colonized with environmental *Penicillium* spp. (incubated at 23°

C., aerobic, 14 d). FIG. 16b—Gram stain of fecal smears of representative GF and SPF mice. Notice the lack of bacteria in 'GF feces'. Notice distinguishable bacteria (morphology in a remarkable clean background; i.e., no other microbes) in 'Early-colonized' GF-mice. Arrowheads; b.1, terminal-oval-deforming endospore-forming gram-positive rod (aerobic; *Bacillus* spp.); b.2, long gram-negative rod in SPF mice; and b.3, junction of two gram-positive dividing long-rod daughter cells in association with intestinal epithelial sloughed cells. Gram stain can detect bacteria in feces before quantitative changes in microbial DNA reach threshold for real-time PCR detection (estimated to be ~100 bacteria per 5-10 µg of fecal smear, if the mean number of rrn operons/bacterium was 10, and if one rrn operon provided one qPCR-detectable copy of DNA template). FIG. 16c—photographic example of GF housing systems that were mobilized out of the GF facility to a (non-GF) BSL-2 microbiological room, where feed-microbiota colonization experiments (FIGS. 16d-f) were conducted. Culture test agreement between paired aerobic-and-anaerobic incubation of mouse feces after feeding thirty-two GF-mice in 19 housing systems an irradiated non-GF diet (binary yes/no data). Aerobic incubation predicted a 10-day contamination outcome correctly in 18 of 19 cohorts. FIG. 16e—ROC analysis of data from panel d shows the predictability of aerobic incubation is similar to that of anaerobic incubation (ROC P=1.0). FIG. 16f—paired fecal culture of feces from a mouse in TSA agar illustrates that bacterial growth is exuberant and colony differentiation more notorious under aerobic conditions (5 d of incubation, 37° C.).

Figure 17:
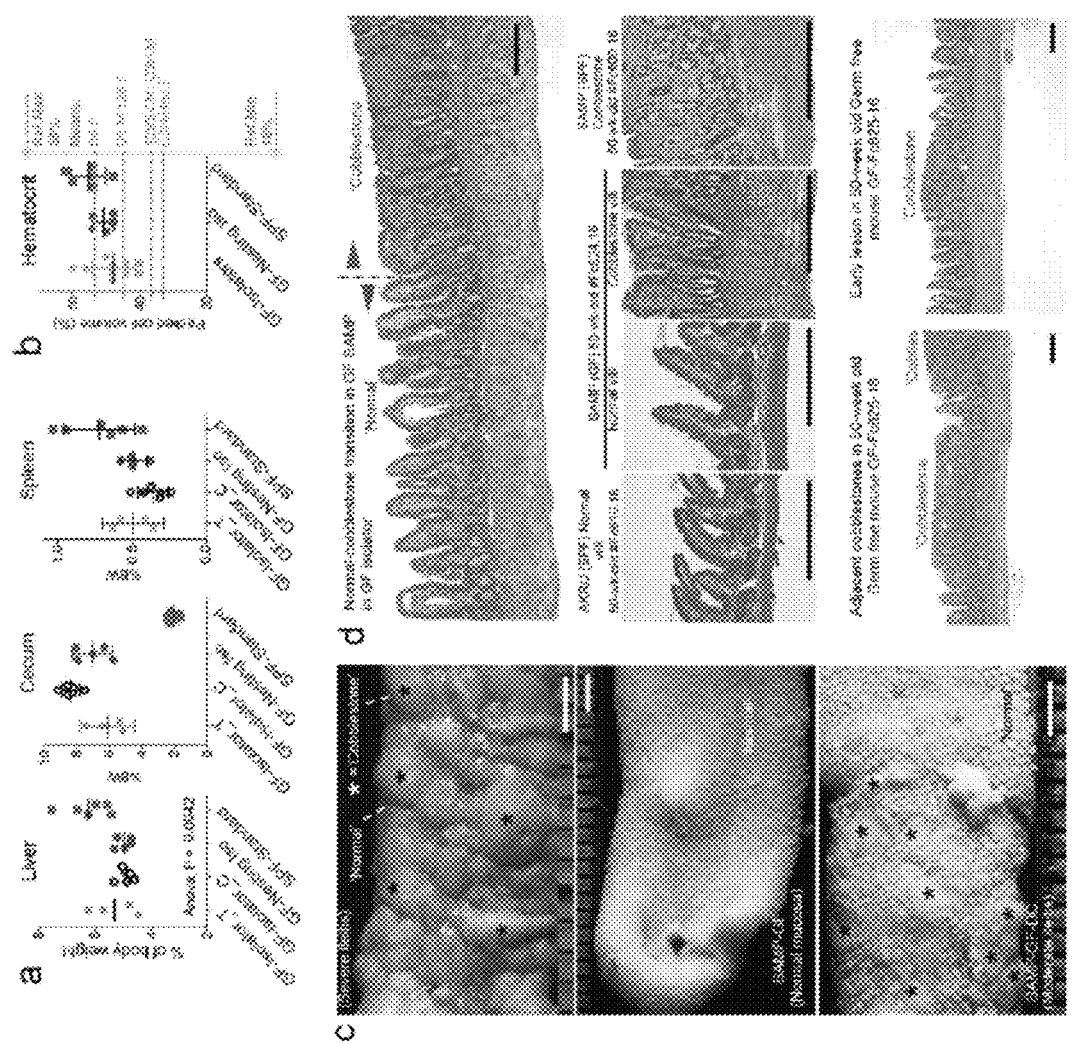

FIGS. 17a-d show organ dimensions, hematocrit and ileitis phenotypes are not affected by certain housing systems of the present application. FIG. 17a—univariate plots of data variability within the expected range for the SAMP mice tested. Prospectively, an experiment assessing the effect of the housing systems in multiple organs (SPF and GF SAMP mice born and raised for 17 weeks either in isolators or housing systems at CWRU, or isolators at Taconic Bioscience illustrates as expected that the normalized organ sizes and the hematocrit (packed red cell volume, surrogate for dehydration/erythrocythemia) are within expected variability and not affected by the housing systems. FIG. 17b—hematocrit data and published reference intervals for various mouse strains (mean±SD). FIG. 17c—stereomicroscopic appearance of mild, moderate and severe cobblestone ileitis in SAMP mice to serve as reference to images shown in FIG. 8c. 3-D-stereomicroscopic analysis of intestinal samples of 45-50-week-old mice confirms the presence of 3D-lesions typical of cobblestone ileitis in SAMP mice raised in GF housing system. Scale bar, 1 mm. FIG. 17d—histological transition between 'cobblestone' lesion and normal mucosa in GF SAMP mice with ileitis in a housing system of the present application. Scale bar, 250 µm.

FIGS. 18a-c show analysis of 16S rRNA microbiome recovery probabilities after microbiota transplantation is preferable to be conducted interpreting microbiome sequence reads in series without eliminating taxa/samples with low counts. FIG. 18a—correlation of read counts for all data at the Phylum level in this experiment for the human donor feces (inocula A and B), the sum of both (interpretation in series), and the percentage of mouse samples with taxa identified in their feces. FIG. 18b—specific example at the order level for Enterobacteriales. Notice that both human inocula have either 4 or 0 reads (≤5 reads) per sample, but their isolation from the mice in GF-grade housing systems showed that 85% of samples had been colonized by that taxa. From a binary statistics standpoint, having analyzed the mouse data in the context of inoculum B alone would have erroneously led to concluding that the taxa in mice was due to contamination. The confirmed GF status of mice in the housing system of the present application, and the control of contamination events showed that cage-cage cross contamination is 100% unlikely. In this context, the housing systems of the present application enable interpreting that the taxa present in the humanized mice are present due to the microbiota transplant and not due to cross contamination from other SPF mouse cages. FIG. 18c—box plots represent the number of taxa with corresponding raw reads added (i.e., interpreted in series) from both human inocula (A+B). Each outlier point represents unique taxa. Notice that removing data with 1-5 reads per taxa (e.g., OTU) will remove a unique bacterial order that was present in 80% of samples from GF mice transplanted with the human feces, and 60% of (3/5) B6 mice tested from our SPF facility (dotted areas). Reference lines represent higher value of higher boxplot in each panel.

Figure 19:
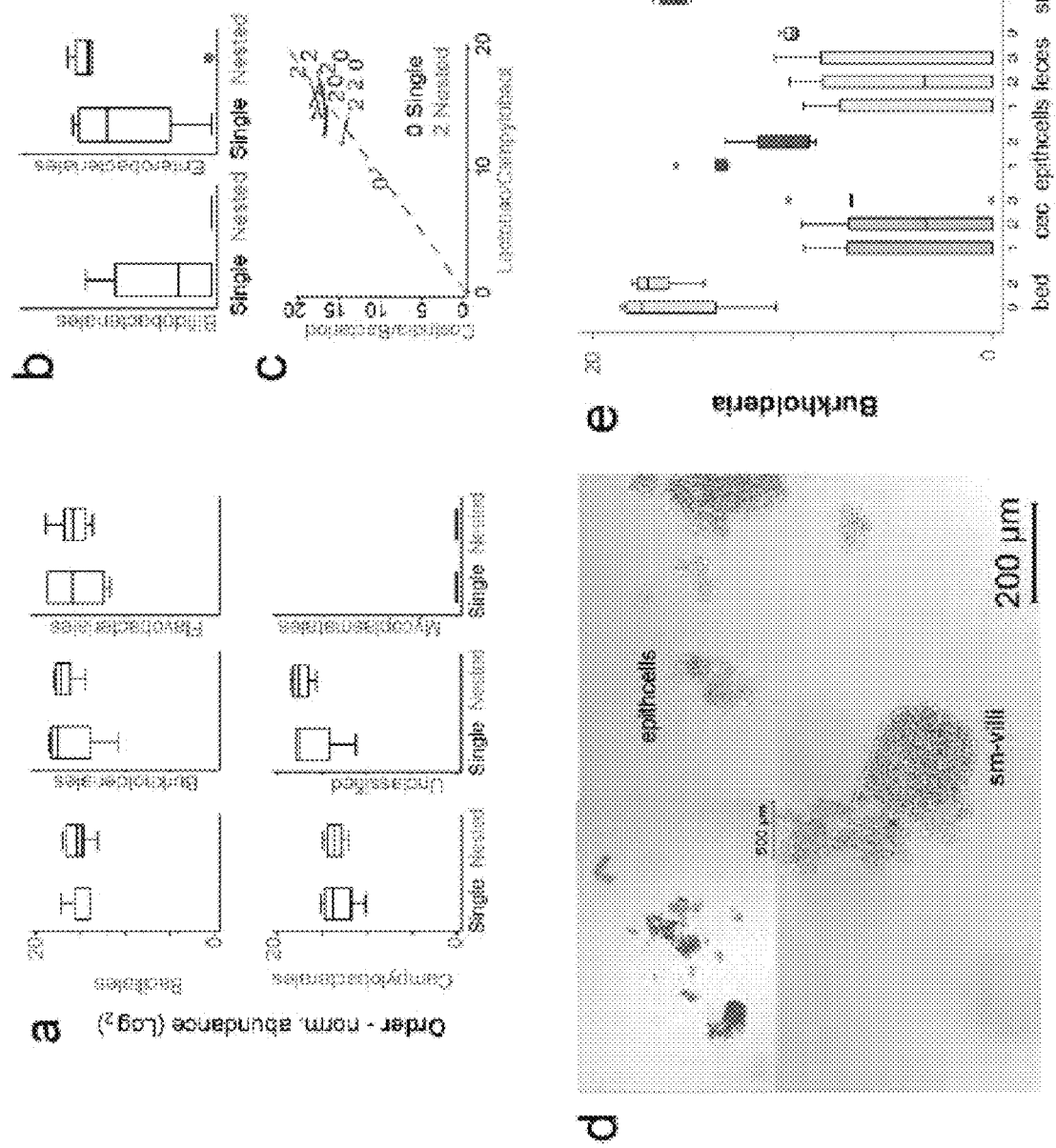

FIGS. 19a-e show microbiome of bedding samples in the context of other samples also illustrates enrichment of Burkholderiales. FIG. 19a—additional representation of 16S rRNA microbiome bacterial orders that are similar in the bedding material after incubation in both housing systems of the present application and Single standard static cages. FIG. 19b—Bifidobacteriales is the only example where there was differential effect due to caging, however, the discrepancy is in the context of cyclical bias likely irrelevant (and a false discovery) because Bifidobacteriales are mainly strict anaerobes and cannot proliferate in the bedding material outside the host. FIG. 19c—the microbiome of the housing system of the present application and single caging are the same after incubation. Paired correlation plot for four orders showed that the mean distances between the two plots are narrow and follow a linear prediction that intersects with zero further suggesting there are no differences in the fecal microbiome changes that can be attributed solely to the use of the housing system of the present application. FIG. 19d—photograph of epithelial cells and ileal villi sample data to contextualize the bedding microbiome analysis. FIG. 19e—16S rRNA microbiome read abundance in bedding microbiome samples [single cages (0); housing system of the present application (2)] illustrating there is bedding enrichment of Borkholderiales with respect to fecal and cecum mouse samples. The parallel abundance of the same order in the epithelial cells suggests that the microbes in this Borkholderiales order may increase as cages get soiled and have biological relevance on digestive/animal phenotypes.

Figure 20:
Figure 21:
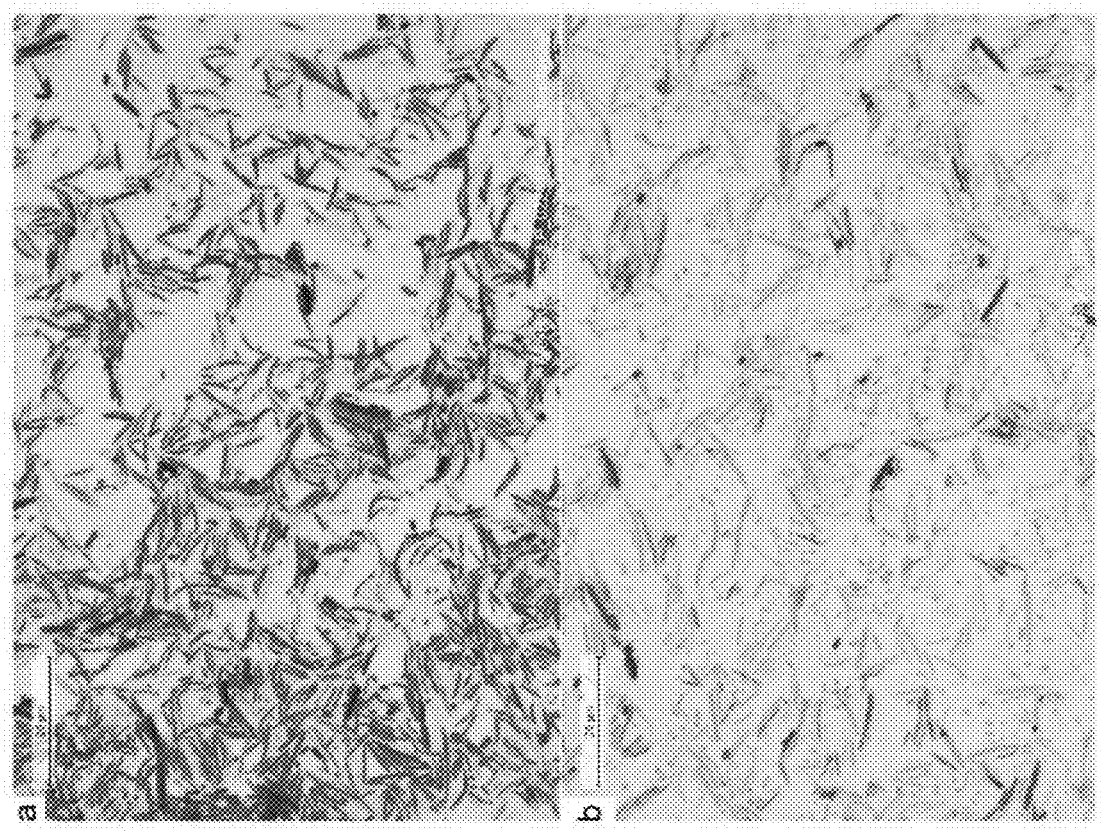

FIG. 20 shows fecal samples illustrated on FIG. 11a after 36 h of incubation on Tryptic Soy Agar supplemented with 5% of defibrinated sheep blood. Left and right quadrants have feces from two littermate mice cohoused for >20 weeks. Top panels have feces from two distinct GF mice (no bacterial growth). Bottom quadrant was not inoculated (negative control). Notice the two cohoused mice have a very distinctive cultivable phenotype. This co-streaking assay was used to monitor the effect of bedding soiledness on intestinal cyclical microbial bias (see FIGS. 12a-f and 22a-b).

FIGS. 21a-b show Gram stain of fecal sample illustrates distinct cohoused gut microbiome profiles are long lasting. FIG. 21a—mouse with relative higher gram-positive:gram-negative microbial ratio. FIG. 21b—mouse with relative lower gram-positive:gram-negative microbial ratio, indicates there is more gram negative organisms and possible LPS-associated antigenic exposure. Images correspond to the same 5 cohoused mice cage #25 depicted in FIG. 11a three months earlier, notice that the co-streaking culture assay profile have also distinct correspondent fecal profiles based on gram-stain of fecal smear used to streak the agar.

FIGS. 22a-b show growth and survival of three abundant fecal murine bacteria incubated in various (corncob bedding: diet) substrates. FIG. 22a—competition split plot experiment where 3 bacteria were inoculated as a cocktail mixture 1:1:1. Notice *Enterococcus faecalis* is the most suitable to grow in all conditions, and remains viable after 9 days of incubation despite dehydration of substrates. *Escherichia coli* in contrast is the least suited to grow in bedding. Notice inhibitory effect of diet in *L. murinus* and *E. coli*. (CFU/g data are shown in $Log_{10}$ units). FIG. 22b—individual 30-hour growth curves confirm that *Enterococcus faecalis* (white) is the fastest growing organism in soiled bedding. See *Lactobacillus murinus* grows better on 5-day-soiled bedding in FIGS. 12a-f.

DETAILED DESCRIPTION

Definitions

Unless defined otherwise, all technical and scientific terms used herein have the same meaning as is commonly understood by one of skill in the art to which the present disclosure pertains.

In the context of the present disclosure, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "from about X to Y" can mean "from about X to about Y."

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of the apparatus in use or operation in addition to the orientation depicted in the figures. For example, if the apparatus in the figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

As used herein, the term "static" can refer to natural ventilation or air flow through a structure (e.g., a housing system of the present disclosure); that is, ventilation or air flow that occurs through a structure without assistance requiring the input of energy (e.g., electrical energy to propel a fan blade). In some instances, static can refer to natural ventilation or air flow through a structure without any mechanical ventilation, pressurization (positive ventilation), or HEPA filtration associated with the structure.

As used herein, the term "germ-free" can refer to the absence of any detectable microorganisms (e.g., viruses, parasites, bacteria, fungi).

As used herein, the terms "specific pathogen-free" or "SPF" can refer to an organism (e.g., mouse) that is demonstrated to be free of a specific list of microorganisms or pathogens by routine testing. The list of microorganisms assessed typically includes disease-causing pathogens that can affect organism health and research outcomes, as well as opportunistic and commensal microorganisms that typically do not cause illness in normal, healthy organisms.

As used herein, the term "nested" can refer to an object or objects that is/are fit (either partially or entirely) within a larger object.

As used herein, the term "organism" can refer to an individual life form. In some instances, a life form can include cold-blooded and warm-blooded life forms. Non-limiting examples of cold-blooded life forms can include reptiles, fishes, and amphibians. Non-limiting examples of warm-blooded animals can include domesticated and non-domesticated animals, such as humans, primates, companion animals (e.g., dogs, cats, etc.), livestock, rodents and birds.

As used herein, the term "chimney effect", also known as a "stack effect", can refer to the movement of air into and out of structures, e.g., buildings or containers, driven by buoyancy, occurring due to a difference between interior and exterior air density resulting from temperature and moisture differences.

Overview

In one aspect, the inventors of the present application have developed a portable, static housing system for animals that does not require mechanical ventilation, pressurization, or HEPA filtration. Rather, as described below, air flow within and through the housing system is driven by intra-cage differences in moist/air buoyancy. The housing systems of the present application advantageously permit movement of germ-free or SPF animals or colonies outside of germ-free facilities for unprecedented experimental purposes.

After two years of experimentation and handling of >45,000 mouse-days in the housing system of the present disclosure, the inventors determined that the housing system is 99.9% isolation efficient, with as low as 0.10% risk of environment-to-cage contamination, and 100% capacity to prevent cage-to-cage dissemination of microbes. With a total of 23,360 germ-free cage-days (equivalent to maintaining a germ-free cage for 64 years), the inventors determined that the cumulative probability of having a cage contamination event for each cage-opening (every 10 days) of the present housing system sets inside biosafety hoods can be identical to the probability of cage contamination in multi-cage pressurized germ-free isolators (the "gold standard"). Moreover, for the first time, using a simple, non-pressurized multilayer housing system that takes advantage of a nested isolation configuration to house germ-free animals allowed the maintenance of such germ-free animals free of undesirable microorganisms for the duration of their life.

The inventors also examined the effect of using the housing system of the present disclosure in mouse microbiome research using conventional mouse specific pathogen free (SPF) feces and corncob bedding, which is a substrate commonly used for bedding material in laboratory rodent facilities. Microbiome experiments showed (ii) that soiled (i.e., mixed with mouse excrements) corncob bedding material remarkably favors the enrichment of fecal murine Bacillales, Burkholderiales and Pseudomonadales; and (ii) that two different levels of bedding "soiledness" can result in different fecal colonization patterns in GF mice, which combined represent a novel source of data variability and bias not currently accounted for in mouse research.

Mutilayer, Static Housing Systems

Figure 1A:
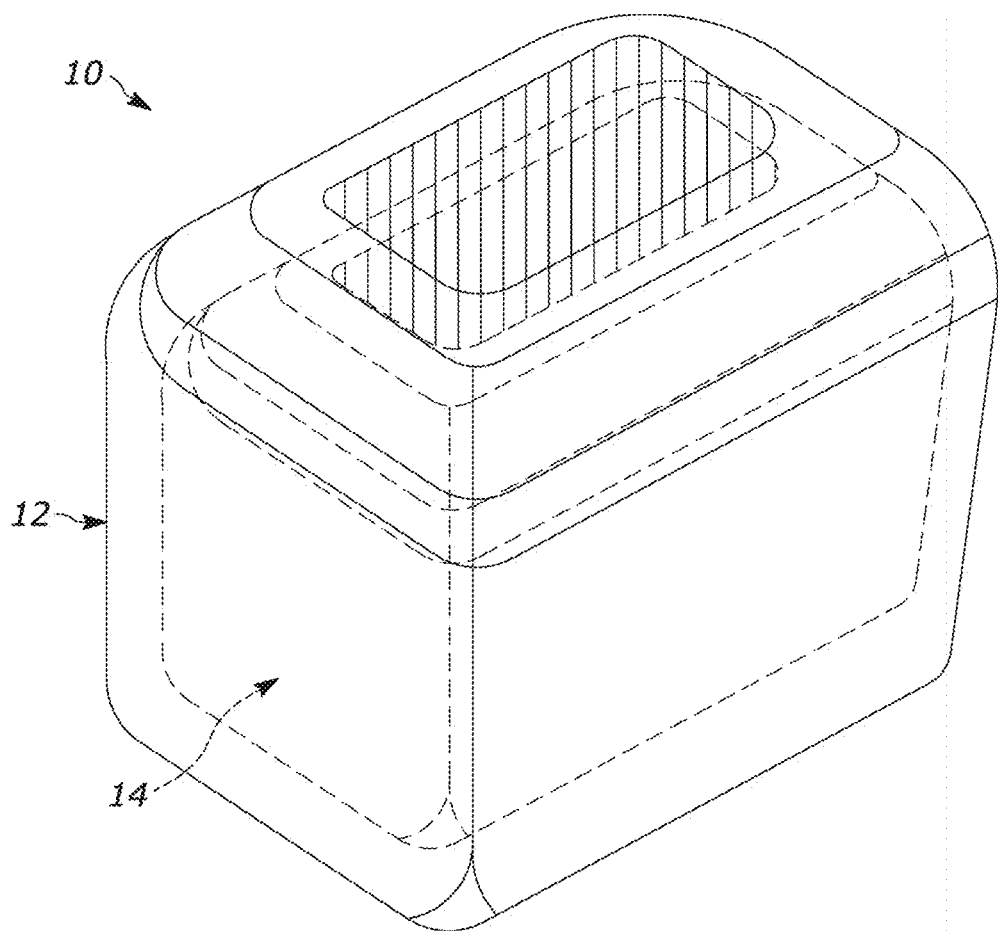
FIGS. 1A-B are schematic illustrations showing a static, germ-free housing system in an assembled (FIG. 1A) and exploded configuration (FIG. 1B) according to one aspect of the present disclosure.
Figure 1B:
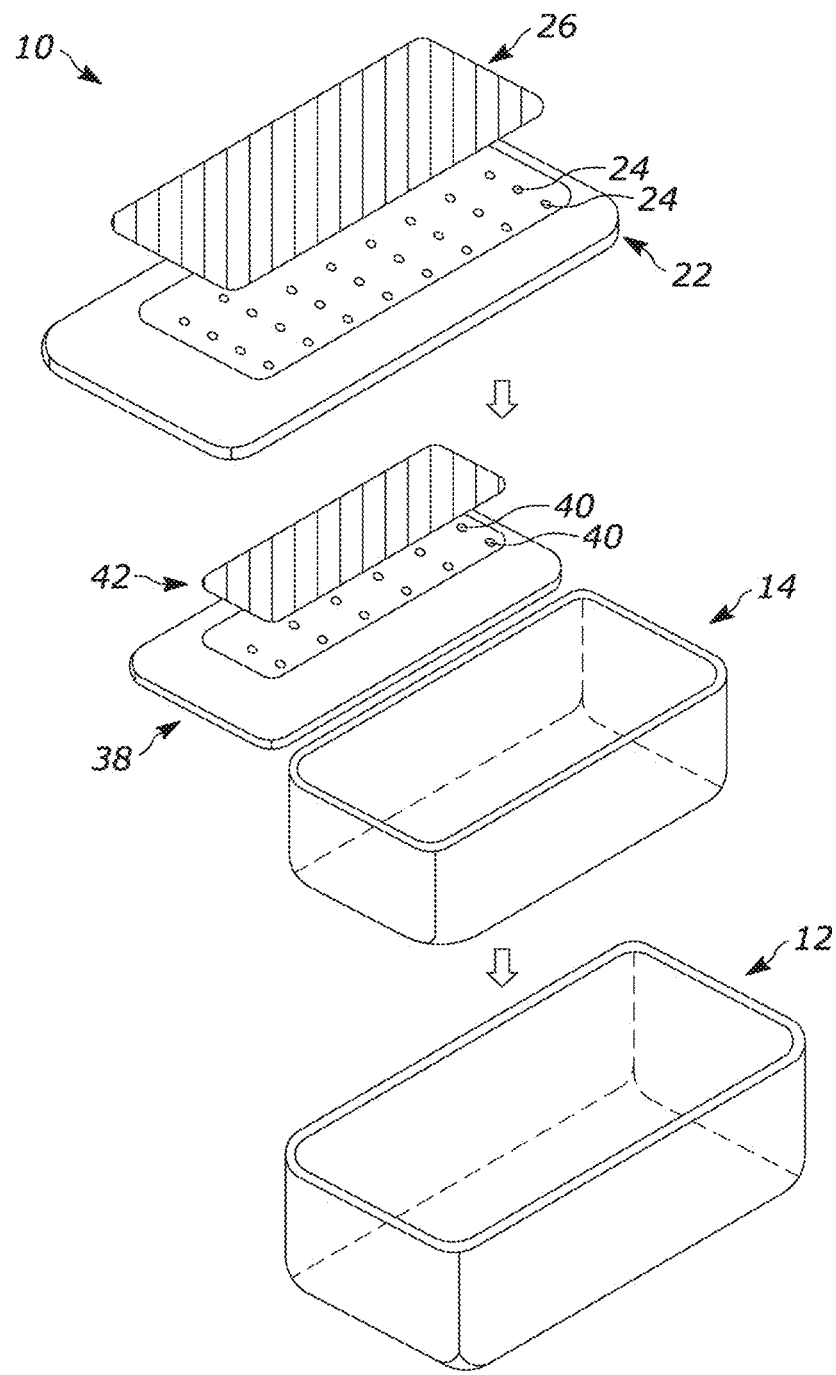
Figure 2:
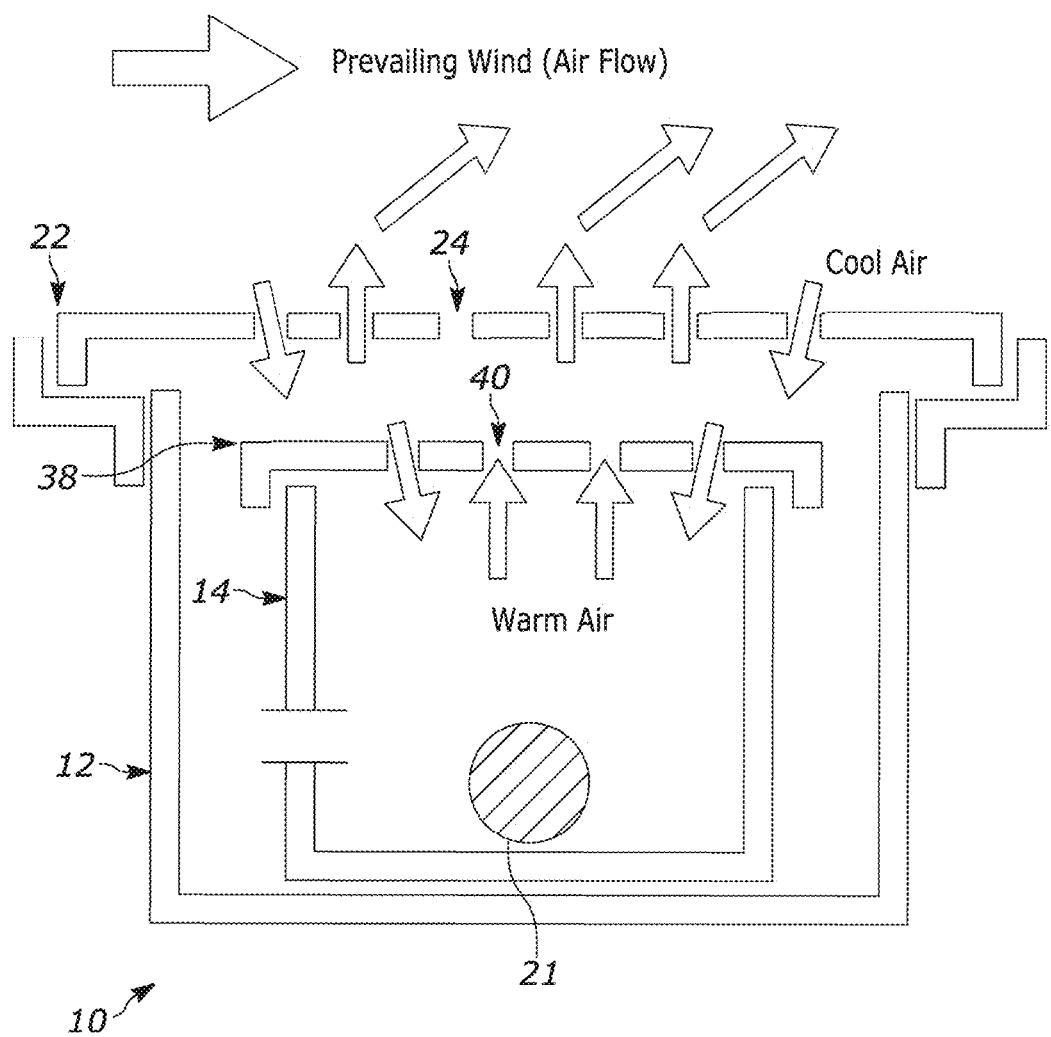
FIG. 2 is a cross-sectional view of the housing system in FIGS. 1A-B showing the chimney effect.

Based at least on the foregoing discoveries, one aspect of the present disclosure can include a multilayer, static housing system 10 as shown in FIGS. 1A-B. In some instances, the housing system 10 can prevent the ingress of microorganisms or pathogens (e.g., viruses, bacteria, fungi) into the housing system by virtue of its multilayer structure, which provides redundant barrier levels to microorganisms. The housing system 10 can comprise a static outer housing unit 12 ("a first layer") and at least one inner housing unit 14 ("a second layer") nested completely inside of the outer housing unit. As discussed in more detail below, the housing system 10 of the present disclosure is sized and dimensioned so that air flow therethrough is driven by the chimney effect (FIG. 2). Conventional housing systems rely on positive pressure for air flow. Consequently, however, such conventional housing systems are more expensive than the static housing system 10 of the present disclosure, lead to stress on animals present in the conventional housing systems, and experience significantly higher contamination rates as compared to the static housing system of the present disclosure.

Figure 3A:
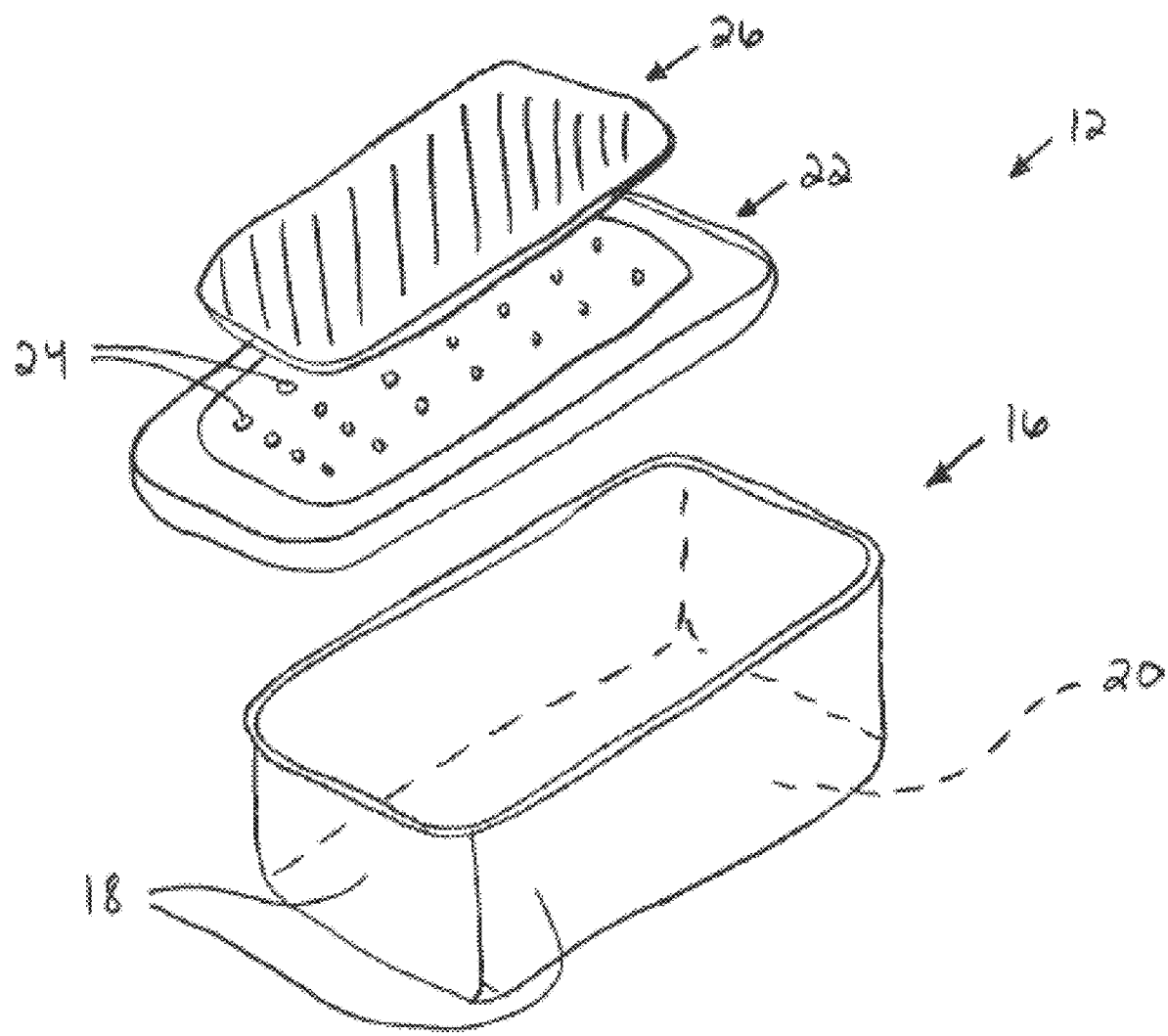
FIG. 3A is a schematic illustration showing a static outer housing unit (exploded view) comprising the housing system in FIGS. 1A-B.

Referring to FIG. 3A, one aspect of the present disclosure can include a static outer housing unit 12. By "static", it is meant that natural ventilation or air flow occurs throughout the outer housing unit 12 without assistance requiring the input of energy (e.g., electrical energy to propel a fan blade). Consequently, the outer housing unit 12 is devoid of any structures, components, or mechanism(s) that is/are associated with, or capable of providing, mechanical ventilation, pressurization (positive ventilation), and HEPA filtration.

The outer housing unit 12 can comprise a body 16 having four side walls 18 and a bottom surface 20 to define a space for receiving the inner housing unit 14. In some instances, all internal corners and the intersections of walls 18 and bottom surface 20 of the outer housing unit 12 can be rounded to reduce the accumulation of dirt and waste and to facilitate cleaning of the outer housing unit. The internal corners may be provided to contour the bottom surface 20 to a desired shape. In one example, both front and back corners of the outer housing unit 12 are substantially rounded to relieve the stress associated with sharp corners.

In some instances, the body 16 of the outer housing unit 12 can be made of high temperature plastic and be transparent to permit observation of an organism 21 (FIG. 2) within the housing system 10 (FIG. 3A). Any suitable transparent material can be used, including glass and/or a moldable polymeric material, such as high temperature polycarbonate to facilitate molding and sterilization of the outer housing unit 12. Such materials will withstand autoclave temperatures of about 275° F. The outer housing unit 12 may be made in a variety of shapes and sizes to accommodate organisms 21 (e.g., laboratory animals) of varying sizes. As shown in FIG. 3A, for example, the body 16 of the outer housing unit 12 can have a rectangular shape.

In another aspect, the outer housing unit 12 can include a removable cover 22. The removable cover 22 can be sized and dimensioned to snugly sit atop one or more side walls 18 of the outer housing unit. The removable cover 22 can be made of the same or different material(s) used to make the outer housing unit 12. All or only a portion of the removable cover 22 can include a plurality of spaced apart openings 24. The openings 24 can be sized and dimensioned to permit the flow of air therethrough. In one example, the openings 24 are distributed over the entire area of the cover 22. In another example, the openings 24 are distributed over less than the entire area of the cover 22 (as shown in FIG. 3A). Although shown as having a circular shape, it will be appreciated that other shapes (e.g., rectangular, square, ovoid) are possible for the openings 24.

In another aspect, the cover 22 can include a filter 26 connected (e.g., directly connected) thereto. The filter 26 can overlie or be seated directly upon all, or less than all, of the plurality of openings 24. In one example, as shown in FIG. 3A, the plurality of openings 24 can cover a rectangular or cylindrical shaped portion of the cover 22. The perimeter of the area covered by the openings 24 can be defined by a rim or peripheral wall (not shown in detail). In effect, the rim can create a seat upon which the filter 26 can be attached so that the filter overlies or is seated directly upon the openings 24. The filter 26 can be sized and dimensioned to completely overlie the openings 24 when attached to the cover 22. In this example, the filter 26 can have a rectangular or cylindrical shape. The filter 26 can be attached to the cover 22 using any one or combination of known techniques (e.g., heat-sealing) to assure a tight fit thereon. In one example, the filter 26 is a non-HEPA filter. In another example, the filter 26 can comprise a non-HEPA spunbond polyester filter, such as those commercially available from Fiberweb, Inc. (Old Hickory, TN).

It will be appreciated that one or more walls 18 of the outer housing unit 12 can include openings 24 and filter 26 disposed thereon. For example, one or more side walls 18 and/or the bottom surface 20 of the outer housing unit 12 can include openings 24 and a filter 26 disposed on or over the openings.

In one example, depending upon the needs of the organism(s) 21 to be housed in the housing system 10 of the present disclosure, a wide variety of materials can be used to form the filter 26. In some instances, the filter 26 will exclude contaminants larger than about one micron, such as contaminants larger than about 0.5 micron (e.g., about 0.1 micron).

In another example, the filter 26 can comprise the flexible air permeable non-woven fabric filters of U.S. Pat. No. 4,540,625 and the filter material comprising porous apatite particles embedded in water soluble glucan of U.S. Pat. No. 5,143,752. Suitable filter membranes are available commercially, e.g., from DuPont and Pall Filtration.

In another example, the filter 26 can comprise an ultra-thin dense composite membrane comprising non-woven materials, which can be sterilized by exposure to gamma radiation, ethylene oxide or autoclaving. In this instance, the membrane creates a passive barrier to the movement of airborne contaminants into or out of the housing system 10, while permitting the exchange of respiratory and toxic gases, carbon dioxide, ammonia, sulfuric waste by-products, microbes as small as 0.1 micron in size and allergens.

Figure 4A:
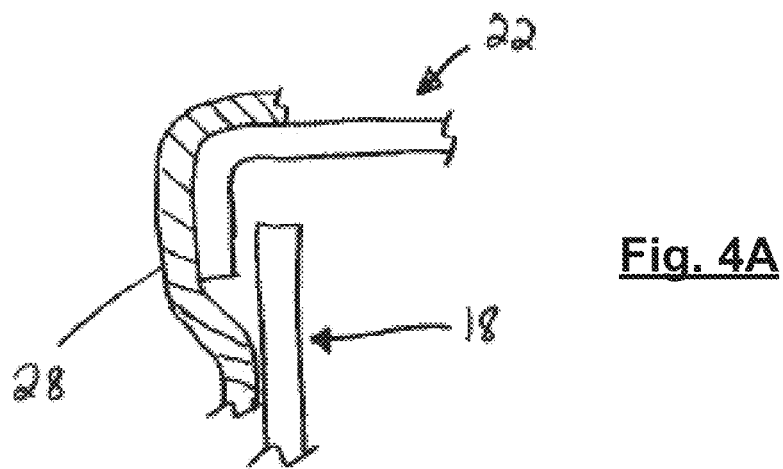
FIGS. 4A-C are schematic illustrations of an air-tight seal formed between an outer wall of the outer housing unit and a removable cover of housing system in FIGS. 1A-B.
Figure 4B:
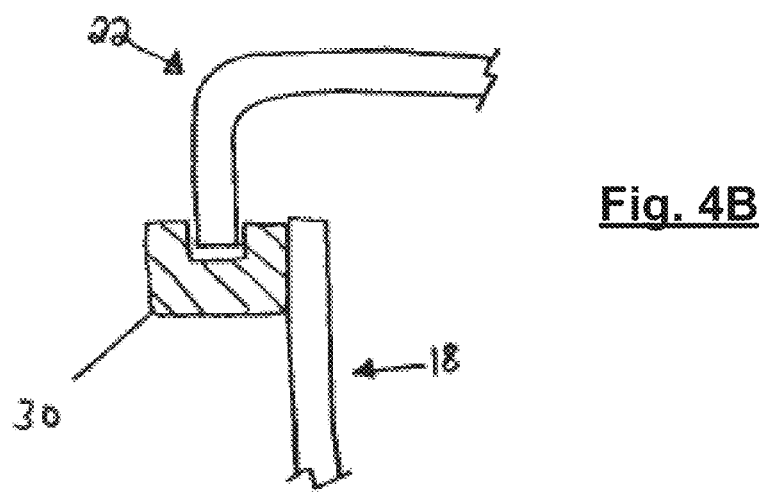
Figure 4C:
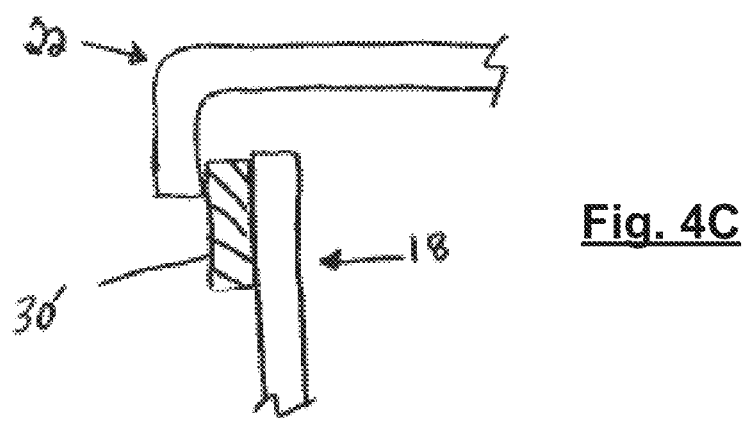

In another aspect, the cover 22 can be seated atop the outer housing unit 12 so that an air-tight seal is formed with the side walls 18 of the outer housing unit. The air-tight seal can be formed in a variety of ways. As shown in FIG. 4A, for example, a piece of plastic 28 can be wrapped around the entire circumference of the housing system 10 so that the plastic covers both a portion of the cover 22 and a portion of each of the walls 18 comprising the body 16 of the outer housing unit 12, thereby forming an air-tight seal. In another example, a flexible, strip-shaped member 30 (FIG. 4B) (e.g., made of rubber or silicone) can be attached about the perimeter of the walls 18 comprising the outer housing unit 12 and be configured to snugly mate with a rim of the cover 22 to form the air-tight seal. FIG. 4C illustrates yet another example whereby a flexible, strip-shaped member 30' can be attached about the perimeter of the walls 18 comprising the outer housing unit 12 and be configured to snugly mate with a rim of the cover 22 to form the air-tight seal.

In another aspect, the housing system 10 of the present disclosure can include at least one static inner housing unit 14 (FIG. 3B) that is nested or completely seated within the outer housing unit 12. In some instances, the inner housing unit 14 is nested within the outer housing unit 12 so that less than the entire volume of the outer housing unit is occupied thereby. In other words, the inner housing unit 14 is sized and dimensioned so that one or more side walls 32 thereof are spaced apart from one or more of the walls 18 comprising the outer housing unit 12. In other instances, the inner housing unit 14 is nested within the outer housing unit 12 so that the walls 32 of the inner housing unit are in direct contact, and flush with, the walls 18 of the outer housing unit.

In some instances, the inner housing unit 14 is static, meaning that natural ventilation or air flow occurs throughout the inner housing unit without assistance requiring the input of energy (e.g., electrical energy to propel a fan blade). Consequently, the inner housing unit 14 is devoid of any structures, components, or mechanism(s) that is/are associated with, or capable of providing, mechanical ventilation, pressurization (positive ventilation), and HEPA filtration.

The inner housing unit 14 can comprise a body 34 having four walls 32 and a bottom surface 36 to define a living space for an organism 21. In some instances, all internal corners and the intersections of walls 32 and bottom surface 36 of the inner housing unit 14 can be rounded to reduce the accumulation of dirt and waste and to facilitate cleaning of the inner housing unit. The internal corners may be provided to contour the bottom surface 36 to a desired shape. For example, the internal corners can be rounded and radiused to sufficiently prevent an organism 21 (e.g., a laboratory animal) from gripping and/or chewing on any portion of the bottom surface. In one example, both front and back corners of the inner housing unit 14 are substantially rounded to relieve the stress associated with sharp corners.

Figure 3B:
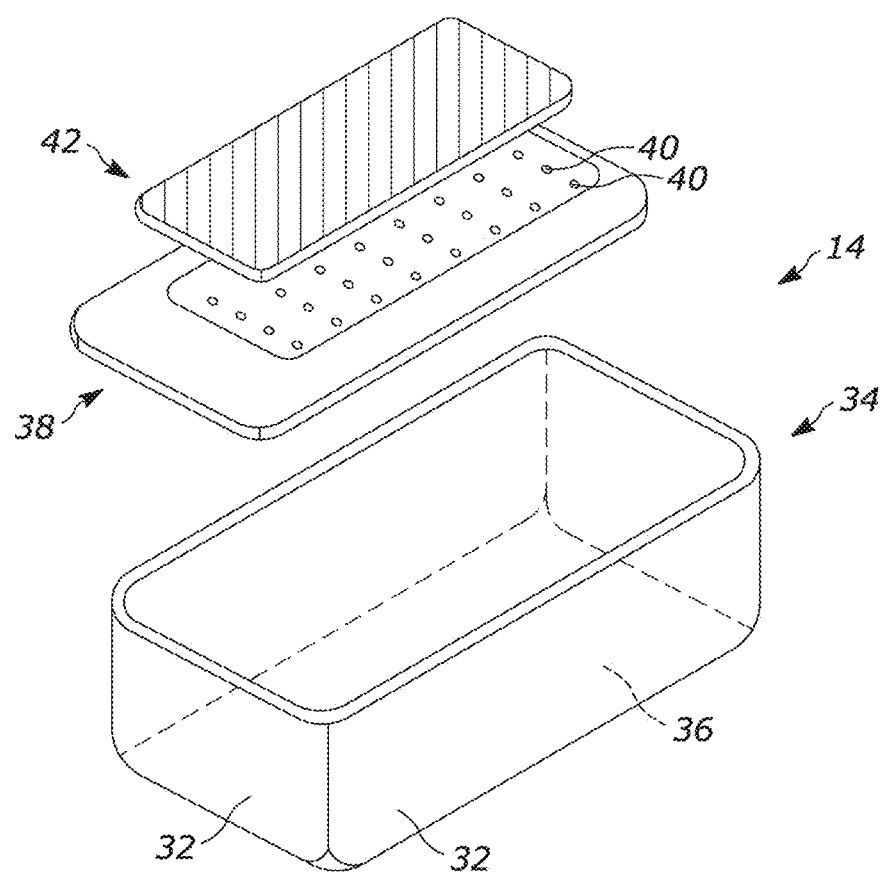
FIG. 3B is a schematic illustration showing a static inner housing unit (exploded view) comprising the housing system in FIGS. 1A-B.

In some instances, the body 34 of the inner housing unit 14 can be made of high temperature plastic and be transparent to permit observation of the organism 21 within the inner housing unit. Any suitable transparent material can be used, including glass and/or a moldable polymeric material, such as high temperature polycarbonate to facilitate molding and sterilization of the inner housing unit 14. Such materials will withstand autoclave temperatures of about 275° F. The inner housing unit 14 may be made in a variety of shapes and sizes to accommodate organisms 21 (e.g., laboratory animals) of varying sizes. As shown in FIG. 3B, for example, the body 34 of the inner housing unit 14 can have a rectangular shape.

In another aspect, the inner housing unit 14 can include a removable cover 38. The removable cover 38 can be sized and dimensioned to snugly sit atop one or more side walls 32 of the inner housing unit 14. The removable cover 38 can be made of the same or different material(s) used to make the body 34 of the inner housing unit 14. All or only a portion of the removable cover 38 can include a plurality of spaced apart openings 40. The openings 40 can be sized and dimensioned to permit the flow of air therethrough. In one example, the openings 40 are distributed over the entire area of the cover 38. In another example, the openings 40 are distributed over less than the entire area of the cover 38 (as shown in FIG. 3B). Although shown as having a circular shape, it will be appreciated that other shapes (e.g., rectangular, square, ovoid) are possible for the openings 40.

In another aspect, the cover 38 can include a filter 42 connected (e.g., directly connected) thereto. The filter 42 can overlie or be seated directly upon all, or less than all, of the plurality of openings 40. In one example, as shown in FIG. 3B, the plurality of openings 40 can cover a rectangular or cylindrical shaped portion of the cover 38. The perimeter of the area covered by the openings 40 can be defined by a rim or peripheral wall (not shown in detail). In effect, the rim can create a seat upon which the filter 42 can be attached so that the filter overlies or is seated directly upon the openings 40. The filter 42 can be sized and dimensioned to completely overlie the openings 40 when attached to the cover 38. In this example, the filter 42 can have a rectangular or cylindrical shape. The filter 42 can be attached to the cover 38 using any one or combination of known techniques (e.g., heat-sealing) to assure a tight fit thereon. In one example, the filter 42 is a non-HEPA filter. In another example, the filter 42 can comprise a non-HEPA spunbond polyester filter, such as those commercially available from Fiberweb, Inc. (Old Hickory, TN).

In some instances, the filter 42 associated with the inner housing unit 14 and/or the cover 38 is identically constructed (e.g., in terms of its material composition) as the filter 26 associated with the outer housing unit 12 and/or the cover 22. In other instances, the filter 42 associated with the inner housing unit 14 and/or the cover 38 is differently constructed (e.g., in terms of its material composition) as the filter 26 associated with the outer housing unit 12 and/or the cover 22.

In some instances, one or more walls 32 of the inner housing unit 14 can include openings 40 and a filter 42 disposed thereon. For example, one or more side walls 32 and/or the bottom surface 36 of the inner housing unit 14 can include openings 40 and a filter 42 disposed on or over the openings.

In one example, depending upon the needs of the organism(s) 21 to be housed in the housing system 10 of the present disclosure, a wide variety of materials can be used to form the filter 42, as discussed above.

Figure 5:
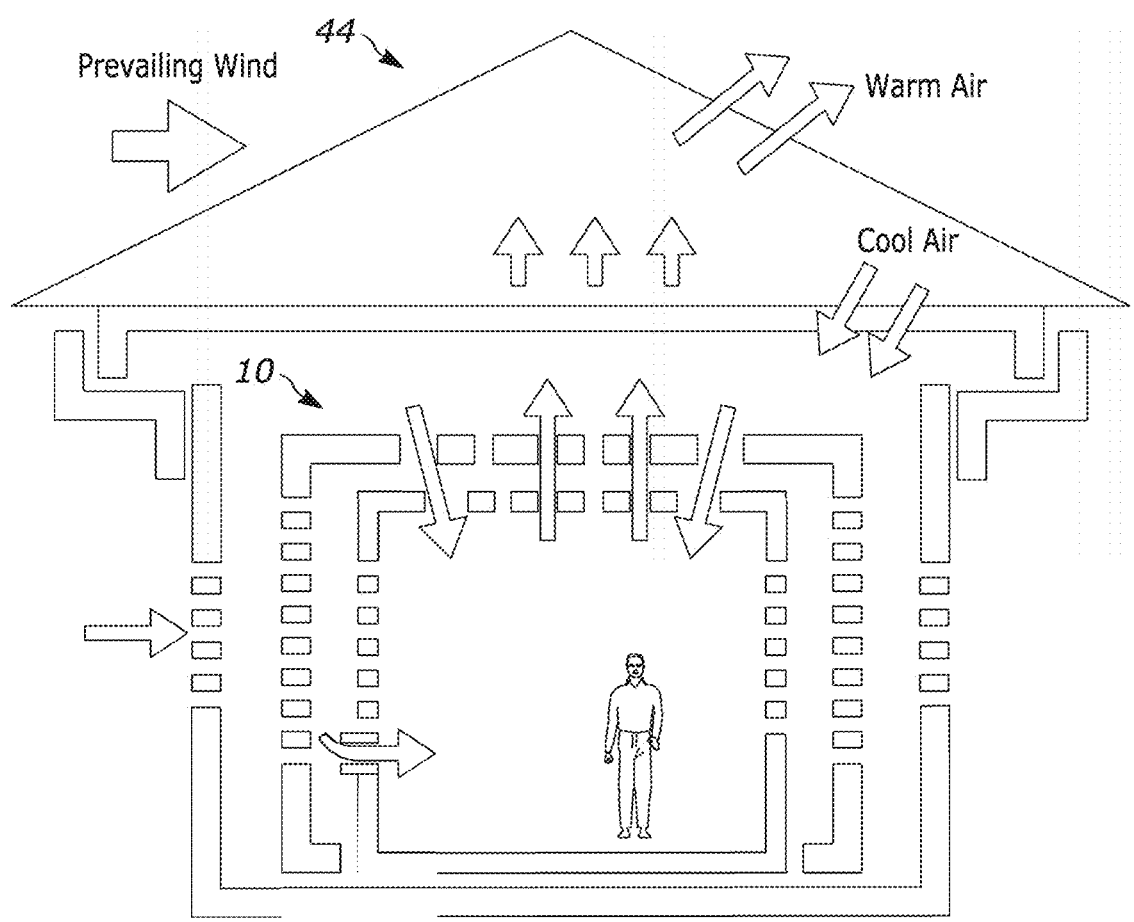
FIG. 5 is a schematic illustration showing one example of the housing system of the present disclosure located in a dwelling.

It will be appreciated that the housing system 10 of the present application can be used in a variety of settings and environments. In one example, a housing system 10 of the present application can be located within a room (or rooms) of a dwelling 44 (FIG. 5), a hospital, or an office building. The use of the housing system 10 in such structures is advantageous because there is no requirement for positive ventilation or mechanical filtration, which is costly and often times unavailable in certain communities and countries.

In another example, the housing system 10 is adapted to receive and hold surgical or medical instruments (not shown) so that the instruments remain sterile before, during, and after use but without the need for positive pressurization or other HEPA filter components that require mechanical ventilation.

In another example, the housing system 10 is adapted for laboratory animal care. In this instance, each of the inner and outer housing units 14 and 12 can be configured as an animal cage. The inner housing unit 14 can include bedding/nesting material (not shown) that is placed on top of the bottom surface 36 so that the resident animal(s) can form nests, burrow and play with the materials. Although not shown, other enrichment or play materials can be placed in the cages, such as small boxes of various shapes and sizes, posts, ladders, treadmills and hammocks. In some instances, the housing system 10 is adapted to receive and house germ-free laboratory animals, such as germ-free mice. In other instances, the housing system 10 is adapted to receive and house SPF laboratory animals, such as SPF mice. In other instances, the housing system 10 is free of any food or water source(s).

Thus, in another aspect, the present disclosure can include a method for rearing and/or caring for germ-free or SPF organisms (e.g., mice), the method comprising placing the germ-free or SPF organisms in a housing system 10 of the present disclosure and caring for the organisms 21 until use of the organisms is desired.

When adapted for laboratory animal care, the housing system 10 of the present application can be used individually for isolation, containment and/or transport of a variety of organisms 21 in research, breeding, housing, storage and shipping. The sizes and proportions of the inner and outer housing units 14 and 12 can be selected according to the needs of the organisms 21 and/or specimens. Advantageously, the housing system 10 is amenable to manual manipulation outside of a polyurethane isolator by placing the entire housing system inside a sterile hood, removing the inner housing unit 14, and removing the cover 38 of the inner housing unit.

Multilayer Isolation Housing Systems

Another aspect of the present disclosure can include a multilayer isolation housing system 46 (FIGS. 6A-B) for laboratory animal care. The isolation housing system 46 can comprise a sterilized rack assembly 48, a plurality of static housing systems 10 that are connected to the rack assembly, and a sterilized curtain 50 that is connected to the rack assembly and sized and dimensioned to drape over at least a portion of each of the housing systems. The isolation housing system 46 is advantageous where significant numbers of laboratory animals are to be maintained and portability is important.

Figure 6A:
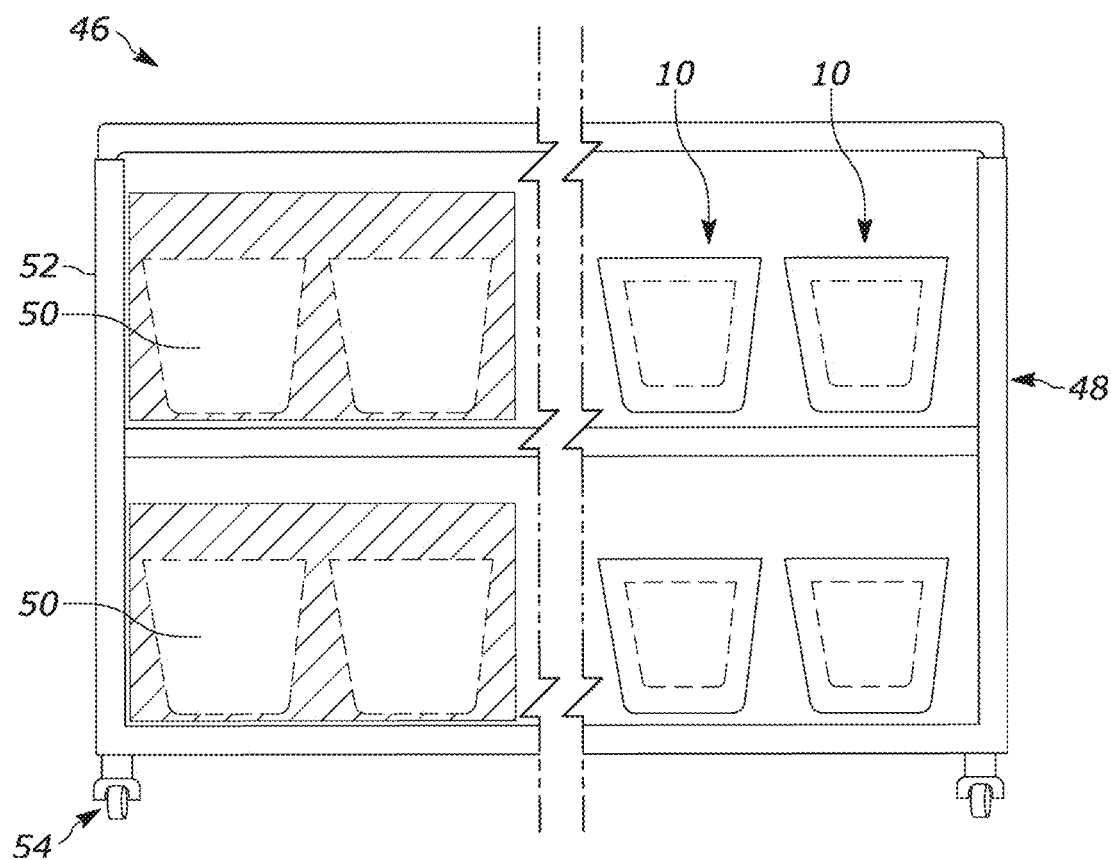
FIG. 6A is a schematic illustration showing a front view of an isolation housing system for laboratory animal care according to another aspect of the present disclosure.
Figure 6B:
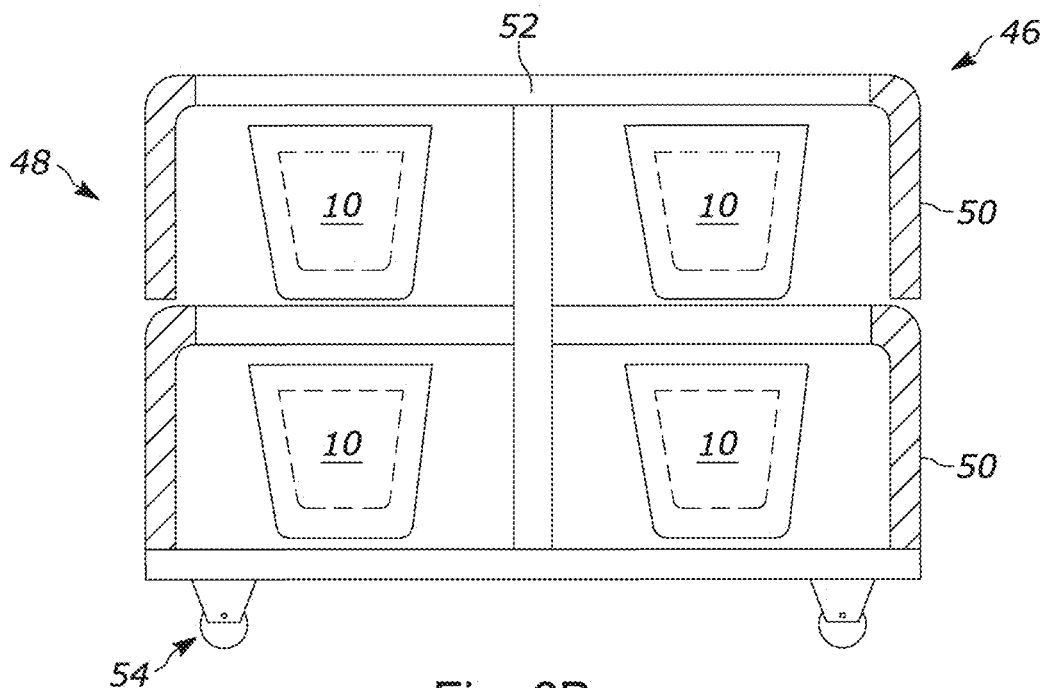
FIG. 6B is a schematic illustration showing a side view of the isolation housing system in FIG. 6A.

FIGS. 6A-B illustrate one example of a sterilized rack assembly 48. The rack assembly 48 can include a frame 52 mounted on wheels 54 with a plurality of shelves connected to the frame. One or more housing systems 10 can be disposed on each of the shelves 56. It will be appreciated that other rack assemblies known in the art can also be used, such as the rack assemblies disclosed in U.S. Pat. Nos. 5,865,144 and 6,257,171.

In some instances, the isolation housing system 46 can include two or more sterilized curtains 50, depending upon the number of shelves 56, for example, and the number of housing systems 10 contained within the rack assembly. Each sterilized curtain 50 can serve as an additional barrier to potentially contaminating microorganisms. As such, the curtain 50 can serve as another barrier layer ("a third layer") to microorganism in addition to the barrier function served by the first layer (the outer housing unit 12) and the second layer (the inner housing unit 14). As shown in FIGS. 6A-B, each curtain 50 is connected at an edge of a shelf 56 so that it drapes downward to completely cover a respective housing system 10. It will be appreciated that the curtain 50 can be comprised of one or more materials that can withstand, and are adapted for, autoclaving.

The following Example is for the purpose of illustration only and is not intended to limit the scope of the claims, which are appended hereto.

Example 1

Materials and Methods
Animals and Germ-Free Facility

The portable static isolation strategy herein proposed was tested by housing inbred germ-free (GF) SAMP1/YitFc (SAMP) and C57BL/6J (B6) mice and outbred Swiss Webster (SW) mice re-derived or obtained from Taconic Biosciences Inc. (Hudson, NY). All mice were maintained as GF colonies at the Animal Resource Center (ARC) at Case Western Reserve University School of Medicine (CWRU). SAMP mice are a sub-strain of AKR/J mice originally developed in Japan that spontaneously develop intestinal and extra-intestinal inflammatory disease, and has a polygenic genotype. GF positive-pressurized HEPA rigid isolators (Plas-Labs Inc™ HEPA filtered isolation glove boxes with maximum capacity of 12-14 cages; 4-5 mouse cages/isolator, 1-5 adult mice/cage) were located inside an ultra-barrier pressurized HEPA-grade facility. Each GF isolator allowed for the manipulation of mice and supplies via four sets of permanent gloves and a port of entry, which was opened as needed, usually once a week. Animals were housed in wire-topped polycarbonate shoebox cages (~30 cm L; 15 cm W; 15 cm H) in a 12 h:12 h light:dark cycle. Autoclaved GF-grade 40-50 kGy irradiated pellet food (PMI Nutrition Intl, LLC., Labdiet® Charles River). Vac-Pac Rodent 6/5 irradiated, 5% kcal % fat) or autoclaved (Prolab RMH 3000; porcine animal-derived fat preserved with BHA; 6.8% content by acid hydrolysis) diets and water in bottles were provided ad libitum. Portability experiments where the housing system 10 of the present disclosure were taken out of the ultrabarrier facility were conducted in BSL-2 grade laboratories equipped with standard HEPA filtration vent systems on the ceiling, but were not positively ventilated or pressurized representing most standard clean laboratories. In those settings, HEPA-filtered air was readily available in biosafety cabinets which were used to open and replace the cages. Protocols on animal handling, housing, and transplant of human microbiota into GF mice were approved by the IACUC and the Institutional Review Board at CWRU, in accordance with the National Research Council Guide for the Care and Use of Laboratory Animals.

Nesting Cages: Static Double-Layer Isolation Setting and Thermography

Cages and materials used are commercially available to assure results are generalizable to other laboratories. In brief, referred to as 'double-caging/triple-barrier' or 'nesting 2-layer isolation' (the housing system 10 of the present disclosure), the proposed housing strategy was tested by housing cohorts of GF mice (produced in standard GF isolators) inside autoclaved static mouse cages, which were then placed (nested) inside larger rat static cages (Allentown Inc., Allentown, NJ; see Results infra and FIGS. 7a-e for details). Animals and cages were microbiologically monitored and handled by trained personnel under strict GF-grade aseptic conditions and our routine GF practiced following stringent disinfection protocols using complete isolation-grade fabric impermeable gowns, double gloves, hairnets and masks, or N95 respirators when deemed medically appropriate for personnel desiring not to be exposed to disinfectant vapors. Thermography infrared image analysis in mice and cages was conducted using standardized principles and a thermal camera (FLIR E95 with Intelligent Autofocal™ Optics) with capability to measure 161,472 point (range, −20 to +1500° C.) temperature pixels allowing allows sensitive detection of spatially confined minute thermal differences (464×348 native resolution, spectral range 7.4-14 μm). Differential quantitation of selected areas was conducted using the proprietary thermography camera software (FLIR tools for Mac™ v.2017).

Animal Handling and Disinfection

Disinfection protocols to ensure aseptic environmental conditions were based on quaternary ammonium-based soap to remove organic matter, 70% ethanol to remove grease and dehydrate; and Spor-Klenz® (Steris Corp., Groveport, OH, 6525; 1% hydrogen peroxide, 10% acetic acid, 0.08% paracetic acid) on rust-sensitive equipment. Floors and other surfaces were disinfected with Spor-lenz® and Clidox® (Pharmacal Research Laboratories, Inc., Waterbury, CT, 96120F, chlorine dioxide). Biosafety hoods equipped with new HEPA filters and sterilized daily or weekly with chlorine gas or Spor-klenz vapors were used whenever cages or animals were manipulated (e.g., feces collection, body weight measurements). Autoclaved sterile gowns and hairnets, masks (N95 or cartridge half-face piece) and impermeable plastic sleeves were worn by personnel to prevent exposure of the housing systems 10 of the present disclosure and animals to human dust or microorganisms, and to reduce personnel exposure to disinfectants.

Husbandry and Sanitation

Although the deleterious effects associated with ammonia are critical in conventional mice, ammonia is not relevant in GF animals (due to lack of urea-utilizer, ammonia-producing gut microbes). For sanitation purposes, replacement of whole housing system 10 of the present disclosure under GF or fecal microbiota transplant experiments followed comparable regulatory guidelines for conventional housing, which is daily monitored by the CWRU ARC personnel and IACUC committee which monitors husbandry compliance with the NRCG-CULA. The housing systems 10 of the present disclosure were replaced every 7-14 days based on animal density, production of soiled material, and animal grinding behavior. Every cage was routinely replaced under biosafety cabinets at least once weekly for animal densities of 3-5 mice/cage, and once biweekly for 1-2 mice/cage. In compliance with static cage usage for conventional (SPF-microbiota) mice, we used corncob bedding due to its absorbent capacity to lower air humidity inside cages. This bedding material has been shown to minimally influence mouse body core temperatures compared to other materials. In all cases, animals were handled using Spor-klenz disinfected, or autoclaved and rubberized 12-inch long forceps.

Microbiological Monitoring of GF Status and Cage-Cage Cross Contamination

All mice inside both pressurized isolators and the housing systems 10 of the present disclosure were routinely tested using standard culture-based microbiological procedures and gram-staining. Culture of feces and cage bedding material was conducted aerobically and anaerobically (10% $CO_2$, 10% hydrogen, 80% nitrogen) using Tryptic SoyAgar (TSA) supplemented with 5% of defibrinated sheep blood. Luria Bertani, de Mann Rogose Sharpe, and McConkey agars were also used (Becton, Dickinson and Company, Franklin Lakes, NJ). Nutritious brain heart infusion broth supplemented with 5% yeast extract was used to test feed sterility and rule out bacterial contamination as needed. To monitor the risk of fungal contamination, we tested selected cages at 1-3 week intervals using fresh feces and direct plating onto potato dextrose agar (PDA), sabouraud, and *Candida* chromID agars (Oxoid, BBL, bioMérieux SA, France; 30° C., 7 days). In addition, we also incubated 20-100% of soiled cages after adding 100 ml of water from the drinking water bottle (23° C., aerobically, 21 days) to allow for fungal spore germination and the formation of vegetative aerial colonies, which aid in the confirmation and taxonomic classification of fungi.

In a culture-independent manner, we also gram-stained mouse feces to verify that animals were not colonized in vivo by microorganisms that may be uncultivable using the in vitro methods described. An expert board-certified microbiologist, who could distinguish microbes from dietary vegetable fibers, intestinal epithelial cells, inflammatory cells, and dye crystals and artifacts, conducted the interpretation of gram stains. If analysis revealed the presence of suspect microorganisms, animals were quarantined and gram stained and re-cultured 1-2 days later to verify mouse colonization (as indicated by an increased number of CFU and gram-stained microbes). Three consecutive negative gram stains or culture results were needed to declare a suspect the housing system 10 of the present disclosure as free of germs (GF), based on infectious guidelines in veterinary medicine where horses with infectious agents (i.e., *Salmonella* spp.) require between three to five consecutive negative cultures to deem a horse free of the pathogen. Our data indicate that two consecutive negative results are optimal to prove the mice were GF, and as such 672 is an approach we use before enrolling any GF mouse cohort into experimentation. PCR was not used to test GF mice, although a qPCR-amplicon RFLP method has been recently validated for GF testing, since DNA of dead and food indwelling microbes could not always be differentiated from active colonization and because PCR has been shown to be less sensitive than culture and gram-staining in identifying intestinal colonization in gnotobiotic mice and poultry. Microbial DNA was also extracted from single purified colonies on TSA or PDA agars using the QiaAmpFast DNA extraction kit (Qiagen, City, ST) with some modifications (bead-beating with Sigma-Aldrich 500-μm beads, MP Fast-prep-24 homogenizer; 1000 RMP 2 runs of 20 s; AS lysis buffer). Microbial identification was based on single colony PCR amplification and Sanger sequencing, using 16S rRNA sequencing of V1-2 regions and Earth microbiome primers 515F/860R90. Ribosomal internal transcribed spacers 1 (ITS-1) and 2, and the 5.8S rRNA regions were sequenced for fungi using ITS1 and ITS4 primers (Rodriguez-Palacios, A. et al., *J Pathogens*, Art. ID 5748745, 2016; Hinrikson, H P et al., *J Clin Microbiol* 43, 2092-2103, 2005). Species designation was based on NCBI Bacterial 16S rRNA and the fungal UNITE databases using BLASTn (Koljalg, U. et al., *New Phytol* 166, 1063-1068, 2005).

Cage Air Humidity and Evaporation of Soiled Bedding Experiments

We hypothesized that adding an extra layer of static filtration around the static mouse cage would presumably reduce ventilation exchange, increasing humidity accumulation measured using digital monitors of air humidity and temperature (AcuRite 00613). Therefore, our first experiment involved the qualitative evaluation of water condensation within the cages with and without external ventilation (by using a 20 cm diameter table fan set two meters from the cages, 1750 revolutions/minute). We tested three conditions (SPF, GF-isolator and GF-housing system 10) and measured (%) air humidity changes over a 7-day period of time inside mouse-free cages that had soiled bedding after housing five mice per cage for 7 days. Lastly, we quantified the rate of evaporation of soiled moist bedding (weight changes) over a 12-day period (longer than the 7 days recommended for regular husbandry of static cages), with and without ventilation. Experiments on cage humidity were conducted without mice to minimize uncertainty due to animal behavior (urine production, grinding). Experiments were conducted in a laboratory with stable room air temperature (23.8±0.57° C.) and relative air humidity (26.5±4.89%).

Mouse Intestinal Disease Phenotype and Survival Analysis

To understand the effects of the housing system 10 of the present disclosure on maintaining mouse phenotypes, we used SAMP mice, which display a well-characterized intestinal inflammation phenotype with 100% penetrance that resembles the typical three-dimensional (3D) cobblestone lesions of Crohn's disease. Body weights was used as an indicator of animal health and welfare, and was monitored beginning in 10-week old mice (n=10) for 90 days after their introduction to the housing system 10 of the present disclosure. Post-mortem histological and stereomicroscopic 3D-pattern profiling were conducted on terminal ilea to assess the persistence of the Crohn's-like intestinal phenotype in the housing systems 10 of the present disclosure.

In another experiment, we compared mean cecum size (cecum weight÷body weight ratio*100) among mouse cohorts, since GF mice have relatively large ceca due to absence of microbiota. For this purpose, adult (>14 weeks old) GF mice in the housing systems 10 of the present disclosure were compared to GF-SAMP mice in isolators, SPF-SAMP mice, and second mouse line prone to developing Crohn's-like ileitis (B6TNFare). To determine if the housing system 10 of the present disclosure increased the risk of mortality in SAMP mice, we compared the natural mortality across cohorts of GF mice housed in the housing system 10 of the present disclosure or GF-isolators for up to 6 months using survival analysis.

Fecal Material Transfer Experiment

To determine the suitability of the housing system 10 of the present disclosure for housing moderate densities of mice that harbor gut commensal microbiota (3-4 mice/cage, without external ventilation), we conducted a humanized fecal matter transplant experiment with 10 GF SAMP mice using frozen feces of a healthy (40-year old) human donor. All methods were carried out in accordance with guidelines approved by CWRU Institutional Review Board. Samples were obtained from the Cleveland Digestive Diseases Research Core Center Biorepository, which is also IRB approved, and which obtain the informed consents from all donors of fecal matter following strict regulations. We manipulated the mice weekly for fecal collection, and monitored the stability of the transplanted microbiota in fresh murine feces at 2, 11 and 21 days post-transplant by performing qPCR to determine the relative abundance of five bacterial families. 16S microbiome analysis of fecal DNA samples from three mice for each time point was conducted by amplifying the V1-V3 regions using Illumina Truseq and HiSeq 4000 protocols. Bioinformatics analysis was conducted using Greengenes and default Qiime pipelines.

Soiled Bedding Microbiome Analysis

To determine the effect of the housing system 10 of the present disclosure on the 16S microbiome profiles, dry sterile dry corncob bedding material was experimentally inoculated with SPF mouse feces (20% of dry bedding weight), moistened with distilled water (25% volume/dry bedding-feces weight; ml/g), homogenized, and divided into aliquots that were placed in 10-cm sterile petri dish bottoms to achieve ~1 cm-thick layers (46.5±2.28 grams of bedding/petri dish). Bedding humidity was adjusted to reach water content comparable to levels in naturally soiled bedding material of cages with breeding mice (i.e., 25% of bedding moisture relative to autoclaved dry corncob bedding in cages with three adult breeders and one-week old pups) after 7 days of housing in GF isolators. After 21 days of incubation of five dishes/cage, inside each of six housing systems 10 of the present disclosure and four standard static mouse cages (23° C., no external ventilation), bedding material was examined in situ for enumeration of fungal colonies and homogenized to extract a pooled sample of DNA for 16S microbiome analysis.

Serology to Assess Inadvertent Exposure to Common Rodent Pathogens

Because certain pathogens (e.g., viruses and *Mycoplasma pulmonis*) cannot be detected by the described culture-based methods, we also collected serum samples from six sentinel GF mice that were housed for six to twelve months in the housing system 10 of the present disclosure to confirm the absence of exposure to 23 rodent pathogens. Fresh sera collected from euthanized mice were independently submitted by veterinary personnel at our Animal Resource Center-CWRU for testing at an external diagnostic institution (IDDEX Laboratory, Worthington, OH). Concurrent testing of other SPF rodent colonies from our institution served as test controls.

Breeding Potential of Acutely Humanized GF Mouse Lines in the Housing System 10 of the Present Disclosure We next tested breeding and early nursing capabilities of mice housed in the housing system 10 of the present disclosure by comparing the breeding efficiency of GF745 SAMP with that of commercial GF-B6 and GF-SW 12-week-old mice transplanted with human gut microbiota. Based on our records, predicted breeding efficiency would rank SAMP mice as the poorest breeders, followed by B6 mice, and then SW mice with the highest number of viable healthy nursed pups by 1 week of age. Following oral gavage with a 400 μL aliquot of human gut microbiota, nine 10-week old mice were housed in housing systems 10 of the present disclosure (5 mice/cage; 2 sets/strain; at 2:3 male: female ratio) and left to mate for 3 days; males were then removed from the cages. The number of pups produced per pregnant dam was determined 30 days after animals were set to breed.

Effect of Exposure of GF Mice from the Housing System 10 of the Present Disclosure to Soiled Bedding of SPF SAMP Mice To determine the potential impact of mouse exposure to different degrees of soiled bedding material on the gut microbiome, nine 20-week-old GF SW mice were exposed overnight to bedding from five SPF 19-week old SAMP mice. SPF bedding originated from a single cage housing a cohort of five SPF-SAMP mice. The bedding material from the SPF cage was sampled at the nesting site and on wetter sites on days 1, 3 and 10 for culture and DNA microbiome analysis. The remaining bedding for days 1 and 10 were homogenized manually (separately) within the cage and aliquoted to be used as SPF-bedding for the cages that would house the GF mice. In average, each GF mouse was exposed to 40 grams for approximately 22 hours. Mice were assigned to either 1-day- or 10-day-SPF bedding a priori in sets of 1, 1, 1, and 2; and 2 and 2 for the 10-d and 1-day SPF bedding aliquots, respectively. After the exposure period, mice were transferred to GF-housing systems 10 of the present disclosure, and feces were collected for culture and DNA extraction for microbiota culture assays. To prevent confounders, mice were not handled for the following three days (housing systems 10 of the present disclosure were sealed and maintained at room temperature), when fecal samples and bedding material were collected for culture and DNA extraction, and mice initially caged singly were re-cohoused together as a trio. Thereafter, during the follow-up phase of the experiment, animals were monitored either in 2 pairs as initially set for 1 day-SPF bedding; and 1 pair and a trio for the 10 day-SPF bedding material. During the following 10-day cage changing cycles, the mice and bedding were sampled on days 3 and 8-10-day post cage change, for three cycles. Analysis of culture data derived from streaking fecal samples on TSA agar was conducted to assess the dynamics of the cultivable fecal microbiota over time. After incubation at aerobic and anaerobic incubation, photographs were taken, and representative colony phenotypes were selected for each fecal profile for sub cultured for purification and Sanger sequencing for species identification as above described.

In Vitro Experiment for Enumeration of a Microbial Cocktail in Bedding Material

By using the housing systems 10 of the present disclosure, the three most abundant bacteria in the co-streaking feces of cohoused SPF-AKR/J mice, and 10-fold serial dilutions in PBS with enumeration in TSA, we quantified to what extent bacteria would grow in housing system 10 Petri dishes containing moist soiled bedding material. Single colony PCR identified the most abundant aerobic bacteria in the AKR fecal sample as *Enterococcus faecalis, Lactobacillus murinus* and *Escherichia coli*. After purification and subculture, we determined that the bacteria in (1:1:1) cocktail experiments orally administered by esophageal gavage to three GF 20-week old SAMP mice (106-7 CFU/mouse in 400 uL of phosphate buffered saline) reproduced the proportions of the 20-week-old donor AKR/J mice (10:1:1). In split-plot experimentation, then we simultaneously inoculated the same 1:1:1 mixture to 5 different sterile substrates (clean sterile corncob bedding, ground GF irradiated autoclaved diet, and three concentrations of soiled bedding; see experimental designs in FIG. 12b). The substrates were aerobically incubated in Petri dishes within the housing systems 10 of the present disclosure for 9 days at 23° C.

Microbiome Analysis

Fecal and bedding microbiome analysis was conducted with sufficient coverage to infer the presence or absence of abundant taxa and to quantify the risk of cross-contamination of transplanted mice with murine SPF microbiota at the phylum level (2-3 Log 3 range difference between 100-bp pair-end reads of most and least abundant bacteria in sample). Total read counts for samples in were approximately 2500 and 25,000-40,000 reads per sample for FIGS. 9a-c and 10a-g, respectively. Binary interpretation of phylum data (presence/absence) indicated that i) recipient mice had a microbiome binary profile ('phylum signature') that was virtually identical to that of the human donor for at least 21 days indicating microbiome colonizability/stability. DNA extraction was conducted using Qiagen reagents (Tissue and blood kit). Library preparation and 16S rRNA microbiome sequencing and primary analysis was conducted using MiSeq Illumina protocols and bioinformatics standard pipelines based on Qiime at the Beijing Genomics Institute in Shenzen, China. Statistical analysis of OTU normalized 0.00017+log 2 transformed data tables was conducted using STATA v13.0 and R software v. 3.4.0 packages.

Mathematical Modeling

The mechanistic exploration of the microbiome driven hypothesis was conducted using available mathematical modeling functions for discontinuous logistic growth of populations with discrete events in R software (R-project, Vienna, Austria) package 'deSolve'. This package contains modules that allow the incorporation of customizable dilution simulation dynamic events to differential equations. The rationale and detailed description of a novel set of mathematical rules governing the periodic dynamics of cyclical microbial bias inferred from mechanistic interpretation of simulated data are available from the inventors.

Statistics

Body weight curves and normally distributed continuous parameters were tested using repeated measures (area under the curves, or univariate sum statistics of paired data points as recommended) and parametric t-test statistics. When assumptions were not fulfilled, nonparametric methods were used. Right-censored survival analysis data was conducted by computing survival fractions using Kaplan-Meier statistics. Point wise 95% confidence intervals of survival fractions were computed using the log-log transform approach. An alpha level of 0.05 was considered in all cases significant. 95% confidence intervals are reported as primary measure of data dispersion to aid in the interpretation of the p values if larger than 0.05 and lower than 0.1. STATA (v.13; College Station, TX, USA), R (R-project, Vienna, Austria), and Graph Pad Prism (La Jolla, CA, USA) software were used for statistical analysis and graphics.

Results

Housing System 10 Design and Thermography

Figure 7:
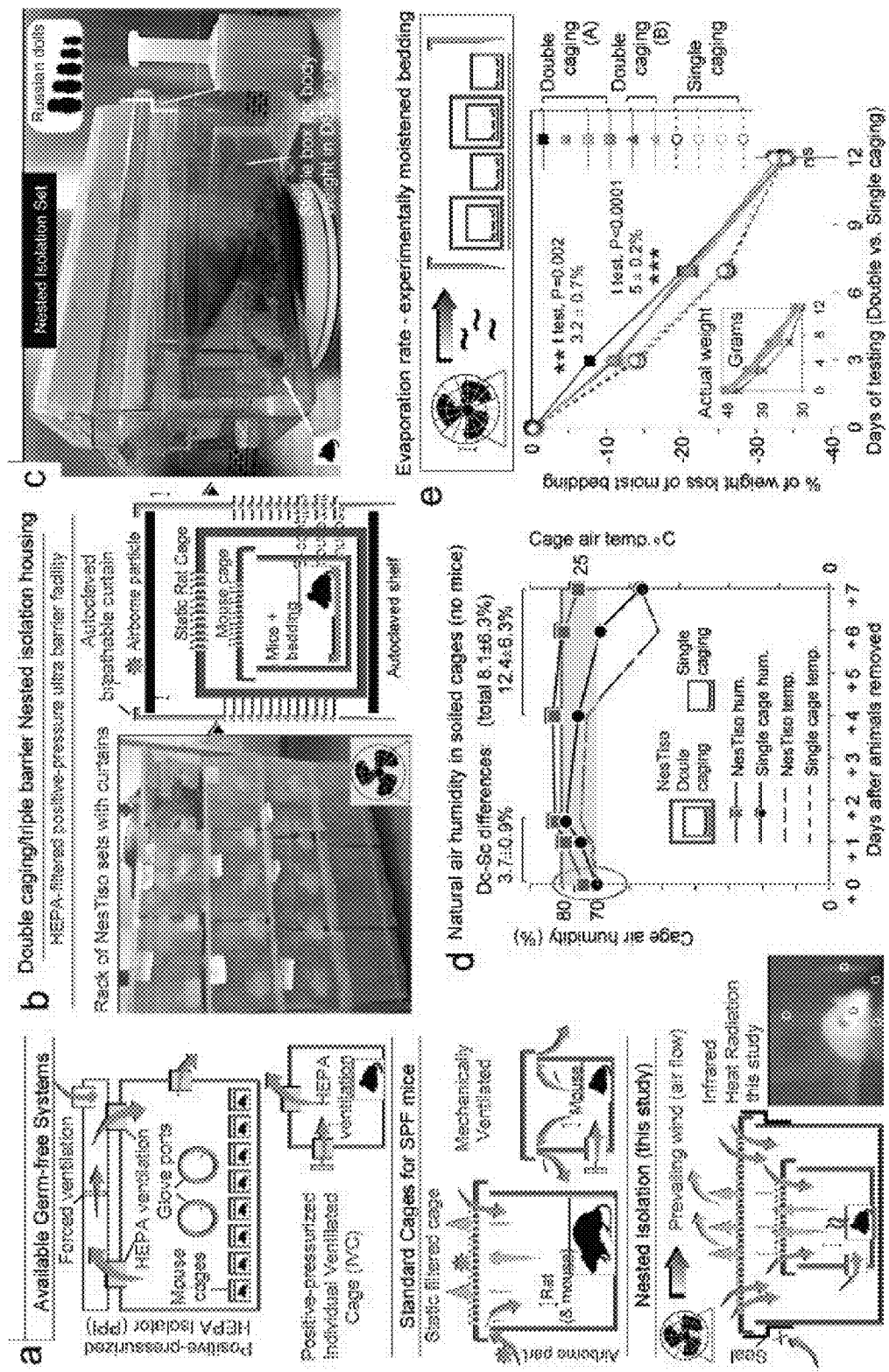
FIGS. 7a-e show a schematic illustration of a nested isolation system design implemented in accordance with one aspect of the present disclosure.

To prevent contact with airborne particles (required for environmental exposure to microbes), the housing system 10 is technically a 'double-caging/triple barrier' or 'nesting 3-layer isolation' system. Implemented using commercially available static cages, we housed cohorts of GF mice born in HEPA-pressurized isolators by placing the mice (SAMP1/YitFc [SAMP], C57BL/6 [B6], and Swiss Webster [SW]) inside mouse cages, and then nesting such cages inside larger rat cages. For air filtration, both nested cages had spunbonded polyester non-HEPA filter lids, which were hermetically attached to the cage bottoms using stretch plastic film. As a third layer, the housing systems 10 were placed on an autoclavable steel rack-cart safeguarded with breathable autoclavable curtains (FIG. 7a-c). Although mechanical ventilation efficiently exchanges air in standard cages, its use arguably causes cold-stress and immune-alterations in mice. Natural ventilation in the housing system 10 of the present disclosure is based on heat convection from the mouse causing infrared thermo-physical effects on the surrounding air. Thermal studies in mice, architectural ventilation laws, and thermography (FIGS. 13 and 14a-e) indicate that cage air, if set at temperatures lower than that of the mouse, warms up by convection near the mouse via respiration or infrared reflectivity and rises, creating a ('chimney effect') column of air moving upward. Rising warm humid air currents then promote replacement with heavier colder clean air moving inward, causing passive air filtration as currents move in both directions through non-HEPA filters (FIGS. 15a-c).

External Aeration Improves Natural Ventilation

Because moist condensation was notorious in high animal density housing systems 10 of the present disclosure (4-5 mice/cage), we quantified the air humidity in the housing systems 10, and the effect of external aeration on 7-day moistened-soiled bedding in empty housing systems 10. Under laboratory conditions of stable air humidity (26.5±4.89%) and temperature (23.8±0.57° C.), natural air humidity in the housing systems 10 was 3.7±0.9% higher compared to static single caging (70.3±1.5%), and cage humidity fluctuated in parallel over time in both the housing systems 10 and single cages, indicating proper moisture exchange in the housing systems 10 based solely on natural moisture-driven ventilation (FIG. 7d). Because external ventilation around the cages could improve air exchange with the cages' interior, we then quantified if aeration of the cage-holding rack by using a household fan could improve natural ventilation, lowering the humidity within the housing systems 10. Experiments on humidity of moistened corncob bedding demonstrated that external aeration was effective at reducing bedding moisture in the innermost cage. Measurement of moist bedding weight changes over a 12-day period demonstrated that aeration caused optimal steep evaporation curves of moist bedding in the housing systems 10 (FIG. 7e), indicating that external aeration improves natural ventilation and bedding dehydration.

Microbial Screening Confirms GF Status of the Housing System 10 of the Present Disclosure Feed indwelling microbes that survive sterilization (gamma-irradiation, autoclaving), airborne particulates, and human skin microbes are common sources of contamination of GF mice. To validate the housing system 10 of the present disclosure as a GF system, we used fecal gram staining and quantified the test agreement between aerobic and anaerobic cultures to identify the most efficient microbial screening. For this purpose, we transported 32 GF mice in 19 housing systems 10 to a microbiology (non-GF, non-HEPA facility) laboratory, where cages were opened twice under a biosafety HEPA hood to feed the mice an SPF-grade irradiated diet over a 10-day period. Culture results showed that aerobic cultivation of feces correctly predicted the results (94.8%) of either mouse colonization with facultative anaerobes (only one cage had strict anaerobes), or the absence of microbes in GF mice by day 10 (FIGS. 16a-d). Kappa statistics confirmed optimal test-agreement (89.5%) between aerobic and anaerobic screening (Kappa=0.78±0.23; Z=3.42; Prob>Z=0.0003). The global performance of both cultures was further tested using receiver operating characteristic (ROC) regression and bootstrapping, where the probability of culture results from randomly selected contaminated cages (sensitivity) was compared to that of random non-contaminated cages (specificity), using as comparator both cultures interpreted 'in series'. ROC predictions showed that aerobic and anaerobic incubation have the same probability of differentiating GF from colonized mice (P=1.0). Because most environmental contaminants are robustly aerobic, we recommend routine aerobic fecal cultures, incubation of soiled cages for fungi, fecal gram staining and weekly anaerobic cultures (FIGS. 16e-f). Mice were confirmed GF, on average, with nine negative tests. Serological health screening was also conducted in mice confirming the absence of reactive antibodies and inadvertent exposure to 23 cultivable and uncultivable pathogens, including viruses (Methods and Table 1).

TABLE 1

Microbial Screening of GF Mice and Portability of Housing Systems of the Present Application

| Pathogen | Disease Description | Transmission |
|---|---|---|
| Bacterial CARB | Chronic pneumonia. Citia-associated respiratory bacillus-bacterial pathogen. Gram-negative, non-spore-forming. Undefined (*Flexibacter, Fusobacterium*). | Primarily via direct contact, often within $1^{st}$ week of birth. Bedding sentinels not efficient means for detection. *Bordetella avium, M pulmonis*, differential diagnoses. |
| *Clostridium piliforme* (Zoonotic) | Tyzzer's disease. Asymptomatic; necrotizing hepatitis, ileitis, typhlitis, or colitis. | Gram-negative filamentous rod-shaped spore-forming bacterium. Ingestion of spores in environment or feces. Spores infectious. |
| *Mycoplasma pulmonis* | Murine mycoplasmosis, chronic supparative bronchopneumonia, lymphoid hyperplasia. | Uterus, middle ear, joints also affected. Direct contact, aerosol; transplacental transmission. |
| Fungal *Encephalitozoon cuniculi* (Zoonotic) | Mycrosporidial (fungal) parasite; rabbits, rodents. Obligate intracellular eukaryotic parasite. Gram-positive. | Renal, neurologic or ocular disease. Ingestion of spores in urine, inhalation. Vertical transmission. |
| Viral Ectromelia virus (Zoonotic) | DNA enveloped. Murine Poxvirus. Family Poxviridae, genus Orthopoxvirus. | Virus found in scabs and feces for >16 weeks post infection. Exposure via cutaneous trauma. Many routes of infection, direct contact or by fomites. |
| EDIM | RNA non-enveloped. Epizootic diarrhea of infant mice virus, murine rotavirus. | Shed in large amounts in feces, fecal oral transmission. No vertical transmission. |
| Hantaan virus (Zoonotic) | RNA enveloped. Murine hantivirus. Asymptomatic, cell lines. Serious infection in humans. | Shed persistently in feces, urine, saliva. Transmission by direct contact or contact with urine or feces. Vertical transmission unlikely. |
| K. Polyoma virus | DNA non-enveloped. Mouse pneumotropic virus. Polyomavirus. Cell lines. | Interstitial pneumonia, lytic lesions, tumors. Ingestion of contaminated feces, or inhalation. Persistent infection, at any age. |
| LCMV (Zoonotic) | RNA enveloped. Lymphocytic choriomeningitis virus (zoonotic murine arenavirus). Asymptomatic. Lymphocytic infiltrates in liver, adrenal, kidney, lung). Cell lines. | Contact with saliva, nasal secretions, or urine. Vertical transmission, virus infects female germ cells, sperm. Immune-complex glomerulonephritis, and vasculitis. Inhibits tumor formation by other viruses. |
| LDV | RNA enveloped*. Lactate dehydrogenase-elevating virus, (murine arterivirus). Paralytic syndrome in AKR/J. | Persistently viremia after infection. Contact via bite wounds or sexual contact. Vertical, transplacental or via milk. |
| MAV1 (FL) | DNA non-enveloped. Murine adenovirus, strain 1 (FL). Asymptomatic. | Transmitted via direct contact with urine, feces, nasal secretions. Type A intranuclear inclusions in adrenal gland. |

TABLE 1-continued

Microbial Screening of GF Mice and Portability of Housing Systems of the Present Application

| Pathogen | Disease Description | Transmission |
|---|---|---|
| MAV2 (K87) | DNA non-enveloped. Murine adenovirus, strain 2 (K87). Asymptomatic. | Transmitted via direct contact with feces. Type A intranuclear inclusions ileum/cecum. |
| MCMV | DNA enveloped. Herpesvirus. Murine Cytomegalovirus/muromegalovirus. Asymptomatic CNS and myocardium. | Excreted in tears, saliva, urine. Vertical transmission may occur. Natural infections localized to salivary glands. |
| MHV | RNA enveloped. Mouse hepatitis virus. Betacoronavirus. Cell/tumor lines. | Asymptomatic. Respiratory, enterotrapic, polyotropic strains. Highly contagious in aerosols, fomites, and contact with feces. |
| MNV | RNA non-enveloped. Murine norovirus. Caliciviridae. Asymptomatic, fecal shed. | Transmitted via fecal-oral route. Hepatitis, peritonitis, and interstitial pneumonia. Replication in macrophages. |
| MPV | DNA non-enveloped. Mouse parvovirus 1-5 and NS1. Asymptomatic | Direct contact Shed in urine, feces, oronasal secretions. Resistant in dust.** |
| MVM (MMV) | DNA non-enveloped. Minute virus of mice, murine parvovirus. Asymptomatic. | More pathogenic for hematopoietic cells than mouse parvoviruses.** |
| MTV | Mouse thymic virus, murine herpesvirus | |
| PVM | RNA enveloped. Pneumonia virus of mice, paramyxovirus. Also non-suppurative vasculitis | Transmitted by aerosol and direct contact with respiratory secretions.** |
| REO3 | RNA non-enveloped. Asymptomatic. Murine Reovirus. Stunting, diarrhea, encephalitis. | Virus shed in feces. Fecal-oral transmission. Direct exposure to airborne dust. No vertical transmission. |
| SEND | RNA enveloped. Sendai, respirovirus. Paramyxoviridae. Pneumonia, dyspnea. Fatal. | Aerosol and respiratory secretions. Not transmitted by bedding. |
| TMEV | RNA enveloped. Theiler's murine encephalomyelitis virus. Cardiovirus str. GDVH. | Transmitted via fecal-oral route. Asymptomatic, paralysis or fatal. |

Mouse ID number, sex and ages of six tested animals were from 5 separate N2LI cohorts, DC-1506A (M, 29-43 week-old), DC-Br1502P (F, 46-43), DC-Br1502P (M, 42-43), DC-1505A, (F, 59-43), DC-Br1503A (F, 60-43), and DC1506 (M, 67-43).
*PCR and serology is advised for virus confirmation.
**Prevention is documented by using cage filter lids. [5-6]Studies on concurrent pathogen prevalence in laboratory rodents from >500 centers in North America, Europe and Asia (over half million mice and rats), have illustrated the prevalence of commonly detected pathogens in mouse rearing facilities that have an impact on animal phenotypes or have zoonotic potential.[7-14]
Rodriguez-Patacios. A et al., A Novel Portable Germ-Free Housing System Using Nested Isolation Revesis 'Cydical Morolax Elas' in Mouse Microbiome Research. Scientific Reports, 2018.

Containment of Microbes and 'Quadrant Infection Control' in the Housing System 10 of the Present Disclosure Collectively, this study represents two years of monitoring mice for a total of >99,530 mouse-days, divided across three rooms (A, B, C). To determine if contamination events could be halted in the housing system 10 of the present disclosure, we tested two strategies: in rooms A/B (~65 cages), we simultaneously tested and replaced cages in the entire mouse colony, eliminating all contaminated cages using an 'all-in-all-out' strategy; in Room C (~35 cages), without testing the entire colony, we only eliminated newly contaminated cages. Since implementation, rooms A/B housed 62,780 mouse-days, of which, 40,880 were in the housing system 10 of the present disclosure (twice the isolators' capacity; ~23,360 cage-days, ~1,987 cage-openings; Table 2 and Table 3).

TABLE 2

Two-year estimated contamination incidence of GF mice in Nested Isolation based on cage replacements every 10 days.

| Mouse colony | Cage counts[a] | | Age[b] (weeks) | | Estimated contamination incidence[cd] | | | | |
|---|---|---|---|---|---|---|---|---|---|
| | Animal density | | | Oldest | (mouse-; cage-days, cage-openings) | | | | |
| inventory (22 month inventory snapshot) | cage count | adult (pups) | mice/ cage | Adult mice mean ± SD | GF mouse | Contamt. cages Cumulative, n= | Cage- days | Mouse- days | Mouse-days per cage | Cage openings |
| B-Room 1-Isolator 1 | 4 | 11 (5) | 4.0 | 30.6 ± 5.8 | 45 | — | 2,920 | 11,680 | 2,920 | 292 |
| B-Room 1-Isolator 2 | 4 | 10 (5) | 3.8 | 25.2 ± 6.0 | 34 | — | 2,920 | 10,950 | 2,738 | 292 |
| B-Room 1-Isolator 3 | 3 | 8 | 2.7 | 23.9 ± 3.7 | 33 | — | 2,190 | 5,840 | 1,947 | 219 |
| B-Room 2-Isolator 4 | 4 | 11 (10) | 5.3 | 25.5 ± 3.7 | 49 | — | 2,920 | 15,330 | 3,833 | 292 |
| Total Pressurized Isolator | 15 | 40 | 2.7 | 26.3 | 49 | 0[f] | 10,950 | 43,800 | 2,920 | 1,095[f] |
| B-Room 1-Nested Isolation | 28 | 65 (11) | 2.7 | 24.9 ± 16.2 | 52 | 2 | 20,440 | 55,480 | 1,981 | 2,440 |
| E-Room 2-Nested Isolation | 21 | 47 | 2.2 | 29.9 ± 13.6 | 45 | — | 15,330 | 34,310 | 1,633 | 1,533 |
| Total NesTiso sets | 49 | 112 | 2.3 | 27.4 | 52 | 2[g] | 35,770 | 81,760 | 1,807 | 3,973[g] |
| Linear colony growth cumulative adjusted estimates for 2-y study AUC[e] | 64 | — | 2.7 | — | — | 2 | 23,360 | 62,780 | 981 | 2,534 |

TABLE 3

Two-year estimated contamination incidence of GF mice in Nested Isolation based on cage replacements every 10 days and two mouse colony inventory snapshots.

| Mouse colony inventory | Cage counts [a] | | | Age[b] (weeks) | | Estimated contamination incidence[c,d] (mouse-, cage-days, cage-openings) | | | | |
|---|---|---|---|---|---|---|---|---|---|---|
| | Animal density | | | | Oldest | | | | | |
| | cage count | adult (pups) | mice/ cage | Adult mice mean ± SD | GF mouse | Contamt. cages Cumulative, n= | Cage-days | Mouse-days | Mouse-days per cage | Cage openings |
| *8 month inventory snapshot* | | | | | | | | | | |
| B-Room 1 - Isolator 1 | 4 | 11 (8) | 4.8 | 25.4 ± 6.8 | 38 | — | 2,920 | 13,870 | 3,467 | 292 |
| B-Room 1 - Isolator 2 | 2 | 5 (8) | 6.5 | 22.4 ± 2.2 | 24 | — | 1,460 | 9,490 | 4,745 | 146 |
| Total Presurized Isolator | 6 | 16 | 2.6 | 23.9 | 38 | 0 | 4,380 | 23,360 | 3,893 | 438 |
| B-Room 1 - Nested Isolation | 6 | 13 | 2.2 | 23.8 ± 15.4 | 45 | 1 | 4,380 | 9,490 | 1,581 | 438 |
| E-Room 2 - Nested Isolation | 7 | 13 | 1.9 | 26.9 ± 1.8 | 29 | — | 5,110 | 9,490 | 1,355 | 511 |
| Total NesTiso sets | 13 | 26 | 2.0 | 25.4 | 45 | 1 | 9,490 | 18,980 | 1,460 | 949 |
| *22 month inventory snapshot* | | | | | | | | | | |
| B-Room 1 - Isolator 1 | 4 | 11 (5) | 4.0 | 30.6 ± 5.8 | 45 | — | 2,920 | 11,680 | 2,920 | 292 |
| B-Room 1 - Isolator 2 | 4 | 10 (5) | 3.8 | 25.2 ± 6.0 | 34 | — | 2,920 | 10,950 | 2,738 | 292 |
| B-Room 1 - Isolator 3 | 3 | 8 | 2.7 | 23.9 ± 3.7 | 33 | — | 2,190 | 5,840 | 1,947 | 219 |
| B-Room 2 - Isolator 4 | 4 | 11 (10) | 5.3 | 25.5 ± 3.7 | 49 | — | 2,920 | 15,330 | 3,833 | 292 |
| Total Pressurized Isolator | 15 | 40 | 2.7 | 26.3 | 49 | 0 | 10,950 | 43,800 | 2,920 | 1,095 |
| B-Room 1 - Nested Isolation | 28 | 65 (11) | 2.7 | 24.9 ± 16.2 | 52 | +1 | 20,440 | 55,480 | 1,981 | 2,440 |
| E-Room 2 - Nested Isolation | 21 | 47 | 2.2 | 29.9 ± 13.6 | 45 | — | 15,330 | 34,310 | 1,633 | 1,533 |
| Total NesTiso sets | 49 | 112 | 2.3 | 27.4 | 52 | 2 | 35,770 | 81,760 | 1,807 | 3,973 |
| Linear colony growth cumulative adjusted estimates for 2-y study AUC[e] | 64 | — | 2.7 | — | — | 2 | 23,360 | 62,780 | 981 | 2,534 |

This Supplementary table is an expansion of Table 1 for comparative purposes of the two inventory snapshots as the number of animals and cages grew steadily over the life of the study.

[a,b] Isolators housed single static cages with young, active, or retired breeders ≤3) and pups. NesTiso cages were mostly used for nonbreeding mice. Totals (averages) for animal density and ages are based on adult mice data (no pups) to illustrate comparability of breeders with nonbreeding mice. Note that age in Nested isolation and Isolators are comparable.

[c] mouse-days or cage-days = n of mice or cages × 730 days; mouse-days/cage = mouse-days ÷ n of cages; cage openings = cage-days ÷ days interval between cage replacement. The two contaminated cages occurred on two separate months of the study.

[d] Inventory snapshots of mouse colony in this experiment at months 8 and 22 were used for crude estimations for a 2-year period, assuming a constant number of mice and cages. Crude estimations of more realistic estimates were derived assuming a linear growth of the colony reflecting an increment of the cage count of 2 cages per month, for a colony expansion from 1 to 49 cages for months 0 to 22.

[e] A geometric estimating approach based on area under the curve is as follows: 64 cages × 2.74 mice/cage/day × 730 days × 0.5 AUC = 64,006 mouse days, which is similar to the 62,780 reported in the table. These approximations are conservative underestimating the actual efficiency of NesTiso in preventing new contaminations, and cage-cage contaminations, since we have at times housed larger number of cages in the study rooms.

In average, housing system 10 of the present application in rooms A/B (2.5 mice per cage; 26.9-week old) required over 1,381 routine fecal cultures and 300 cage fungal incubations to monitor GF sterility. Only two cages were contaminated in room A (50 mouse days), once with a fungus (*Penicillium* spp.), and 8 months later with a bacterium (*Bacillus* spp.). With ~1,987 cage-openings (once/10 days), the risk of cage contamination with every opening was 0-0.1% (room A: 2/1,220; room B: 0/767). Estimates indicate the daily risk of mouse contamination in the housing system 10 of the present disclosure is 1 out of every 817 (50:40,830) days of housing using the 'all-in-all-out' strategy, which is longer than our oldest GF mouse born and housed in the housing system 10 of the present disclosure (1.39 years of age). Comparatively, the housing system 10 of the present disclosure effectiveness was similar to managing cages in isolators, which had no contaminations in 2 years (0/548 cage-openings; 1-sided Fisher's P=0.61); however, the housing system 10 of the present disclosure contaminations were restricted to affected cages (100% prevention), in contrast with reports of extensive dissemination of microbes across cages in isolators. With 23,360 GF cage-days (equivalent to maintaining a GF cage for 64 years), the cumulative probability of having a cage contamination event for every cage-opening (every 10 days) of housing systems 10 inside biosafety hoods was identical to that of opening cages inside the multi-cage pressurized GF isolators (2 events/1,971 openings vs. 0/548, two-tailed Fisher's exact P=1.0, Table 2).

Because simultaneous 'all-in-all-out' testing and cage replacement of an entire housing system 10 colony can be stressful and laborious, we confirmed in room C (~35 cages, ~420 days, ~36,750 mouse-days) that eliminating only contaminated cages was ineffective at maintaining a low incidence of cage contaminations. We then validated that a housing system 10 colony could be divided into quadrants for 'all-in-all out' infection control (one quadrant/day; overnight disinfection), showing effectiveness comparable to the 'all-in-all-out' approach, while reducing technical stress.

Long-Term Phenotypes, Survival and Breeding are Unaffected by the Housing System 10 of the Present Disclosure As alternative to measuring time-point cortisol levels as a measurement of animal adaptability, which induces stress to animals and increases the risk of microbial contamination in GF mice, we determined whether the housing system 10 of the present disclosure is suitable for the study of murine morphological and breeding phenotypes. One of the functions of gut commensals is to aid in digestion and modulate tissue morphology. By comparing organ dimensions from mice housed in GF-housing systems 10, GF-isolators and SPF conditions, we determined that the organ biomass and hematocrit (as surrogate for dehydration and erythrocythemia) of GF-housing system 10 mice were similar to that of GF mice in isolators in comparison to SPF mice (FIGS. 8a-d). We then assessed whether housing system 10 caging affected the spontaneous intestinal disease phenotype in SAMP mice, and found no effects on the natural three-dimensional occurrence of Crohn's disease-like ileitis (cobblestones) lesions in GF-SAMP mice, SAMP survival (five-month), or the SAMP body weight (three-month) after transplantation with normal human fecal microbiota (FIGS. 8c-e and 17a-d). Furthermore, the housing system 10 of the present disclosure did not induce signs of systemic, integument, or intestinal diseases in ileitis-free GF-B6 and GF-SW mice. A four-week breeding trial, conducted by cohousing males and females (2:3/cage; 2 cages/strain) for three days, also determined that breeding yields in the housing system 10 of the present disclosure for the three mouse strains were ranked as expected after 30 days. SAMP mice were the least productive strain (one pup from 1/6 females); B6 were intermediate (8 pups from 1/6 females), and SW were the most productive (67 pups from 6/6 females; Fisher's P<0.05). Long-term survival in the housing system 10 of the present disclosure was further documented in this study by breeding and maintaining GF mice for as long as 72 weeks of age, when animals were removed solely for experimental purposes or died due to aging-associated complications. Other studies have followed GF animals outside isolators only for 2-3 or 12 weeks.

Human Fecal Microbiota Transplants to Mice in the Housing System 10 of the Present Disclosure The containment of microbes in the housing system 10 of the present disclosure makes the system ideal for studying the stability and colonizability of human fecal microbiota transplants (FMT) in GF mice. Because FMT-mice often require BSL-2 isolation in facilities housing SPF-mice, we tested the portability of housing system 10 FMT-mice to a BSL2-room, sharing biosafety hoods with 20-30 SPF-cages. We determined whether 12-week-old mice would have stable FMT microbiota in the housing system 10 of the present disclosure, and whether housing system 10 FMT-mice would have 16S rRNA gene microbiome signatures of SPF mice. Fecal DNA and quantitative real-time PCR analysis of four 16S rRNA-universal and -specific bacterial taxa primers (Lactobacillaceae, Bacteroidaceae, Bifidobacteriaceae, segmented filamentous bacteria) showed that FMT in GF-SAMP was stable over 14 days in the housing system 10 of the present disclosure (FIG. 8f).

Slightly extending the study period to 21 days to encompass the establishment of adaptive immunity, 16S rRNA microbiome analysis of fecal samples that were randomly collected from 10 mice sampled on days 2, 11 and 21 after FMT showed that FMT-mice in the housing system 10 of the present disclosure had the healthy profile of the human donor (6/6 of 31 possible taxa) that was rich in Firmicutes, while conventional concurrent SPF mouse signatures in the same facility were distinct and rich in Bacteroidetes (FIG. 9a-b). These 16S rRNA microbiome data further support the housing system 10 of the present disclosure as a suitable portable caging system that can be used to prevent cage cross-contamination, facilitating the parallel study of diverse microbiotas and their effects on transplanted GF mice. By categorizing read count data as binary (presence/absence), and using probability-of-recovery statistics (% of mice transplanted having the taxa), we also noticed that two analytical replicas interpreted 'in series' (sum of taxa reads in both replica) normalize the distribution of low abundant taxa making it preferable over interpretation 'in parallel' (only taxa positive in both replica), or using single aliquots. When using the housing system 10 of the present disclosure in FMT experiments, it is thus advisable to submit donor aliquots for microbiome sequencing and interpret the profiles 'in series' (FIGS. 9c and 18a-c).

Housing System-Independent Enrichment of Fecal Bacillales and Pseudomonadales in Soiled Bedding Because the housing system 10 of the present disclosure may increase air humidity if not aerated, we hypothesized that FMT studies performed in the housing system 10 of the present disclosure could favor the selection of certain fecal microbes compared to conventional single caging. This was important as we noticed some contaminants thriving in soiled-humid bedding, while others unexpectedly disappeared from GF mice in dry (frequently-replaced) cages. In split-plot experimentation, we determined that the DNA microbiome profile of a freshly soiled SPF-SAMP bedding mixture (split into 40 petri dishes) was identical for the housing system 10 and single caging after incubation for 28 days at 23° C., indicating housing system 10 double caging did not contribute to microbial bias (FIGS. 10a-c). Collectively, however, bedding microbiomes were significantly enriched with Bacillales, Pseudomonadales and Burkholderiales when compared to fecal mouse microbiome studies from conventional single cages (FIGS. 10d and 19a-e). More relevant, an expanded comparison showed that coincidentally the same orders (Bacillales and Pseudomonadales) were markedly enriched in stereomicroscopically dissected mucosal-associated microbiomes, rising concerns for the first time about potential bias driven by their cyclical selection and enrichment in soiled bedding (FIGS. 10e and 19a-e). Interestingly, we have identified in our facility and during this study Bacillus spp., Staphylococcus petrassii/aureus, Paenibacillus woosongensis, and Pseudomonas alcaligenes as GF contaminants, supporting the relevance of both Bacillales and Pseudomonadales.

Modeling of Bacterial Growth and Survival Over Cyclical Enrichment/Dilution Events The enrichment of certain microbes in the bedding material might depend on the type of substrate and lead to cyclical changes in the cage microbiome as cages become warm, humid and rich in organic matter over time (FIG. 10f). Quantitation revealed that the organic 'nutritious' enrichment in the bedding has linear dependence on animal density, 'bedding cycle' interval (clean bedding becomes soiled, then replaced with new bedding usually 7-10 days), and grinding behavior (e.g., by day 10, a 5-mice-bedding contains 6.9% feces and 43.6% diet). To visualize the periodic dilutional effect of cage replacements at fixed intervals on microbial selection (both survival and extinction), we implemented a mechanistic mathematical model using a logistic function validated for bacterial growth in liquid medium coupled with a customizable event function accounting for periodic dilution events (as surrogate for bacterial and organic substrate replacement), using open-source 'deSolve' to run simulations in open-source R software. Simulations illustrated how fast-growing microbes, depending on their rate of growth, persist in the model over several cycles, while slow-growing microbes become extinct (FIG. 10g), and importantly allowed the recognition of unaccounted periodicity mechanisms influencing cyclical microbial selection and what we herein refer to as basic bedding microbiome periodicity rules. With mathematical visualization of differential microbial selection over dilution events, we next tested whether bedding soiledness influenced the gut microbiota profile in mice.

Co-Streaking Culture Assay Reveals Bedding Soiledness Cyclically Influence the Gut Microbial Profile We hypothesized that mice from the housing system 10 of the present disclosure exposed to 1-day-soiled SPF-bedding would have a different fecal microbiota profile compared to mice exposed to 10-day-soiled SPF-bedding, and that over time their individual profiles would periodically vary with every bedding cycle. Because microbiome data is time/technically intensive, we developed a rapid culture assay of feces (streaked on TSA blood agar, incubated overnight; reproducible across fecal pellets) that facilitated the enumeration of colony types and thus the cost-effective assessment of gut microbial dynamics in near real time. By streaking the feces of 'co-experimental' mice on the same agar plate, our 'co-streaking assay' became a semi-quantitative screening tool to visualize the periodic dynamics of the gut microbiota (FIGS. 11a and 20). Remarkably, we found in a 30-day (3-bedding-cycles) experiment that overnight exposure of GF-SW (healthy) mice to the bedding of SPF-SAMP (ileitis-prone) mice yielded persistently different co-streaking patterns in mice exposed to 1- vs. 10-day-soiled bedding. As hypothesized, co-streaking showed more diversity (colony types) across cages and mice on day 3 after cage replacement, which remarkably disappeared (less diversity, primarily same colony type) by days 8-10, a phenomenon that recurred with every bedding cycle. We also noticed that within cages, some animals cyclically exhibit their own pattern of microbiota profile (individuality), which were markedly influenced (cyclically disappeared) as cages became soiled (FIG. 11b-d). Confirming the high occurrence of within cage individualities, a cross-sectional screening of 80 adult SPF (AKR, B6, B6TNFdeltaARE/+, SAMP) mice in 45 cages (without controlling for bedding soiledness) revealed that up to 70-82% of cages cohousing >2 genetically-identical mice had >1-2 individual co-streaking patterns, which contradicts the perception that cohoused SPF mice have the same microbiome profile (FIGS. 11a-d and 20-21b), identifying an new unrecognized form of microbiome intra-cage variability despite presumed homogeneous coprophagic behavior and rising questions about cohousing as a preferred design in mouse microbiome research, especially since cohousing also alters numerous phenotypes of interest (e.g., metabolism, obesity, inflammation). Alternatively, we have developed a protocol where all experimental mice are not cohoused (since an ideal cohousing design would be impossible, and not simple since IACUC approved maximum animal density is 5 mice/cage, but studies require larger number of animals) but instead gavaged a composite of their collective microbiota, allowed to establish a baseline collective microbiome, and then followed up target phenotypes to determine the functional relevance of microbiota that animals select as experiments progress. In the context of well-known long-term microbiome stability and the stable core microbiome in humans, our findings also raise questions about whether the assumption of 'difficult-to-control' temporal microbiome stochastic variability reported in mice is truly biologically correct, or whether such 'temporal variability' represents the distribution of study results randomly confounded by an unrecognized technical artifact that occurs when the timing of animal sampling for microbiome analysis in not controlled and accounted for as a function of bedding microbial selection. Therefore, we assessed the effect of various degrees of bedding soiledness on the competitive growth and survival of three cultivable fecal microbes, representing distinct bacterial families detectable in SPF mice.

Dose-Effect Study In Vitro Illustrates Soiledness Favors One of Three Abundant Gut Aerobes Various bedding substrates are available for use with rodents, including corncob, paper products, aspen wood chips, cotton and grass fiber pellets; however, animal welfare regulations recommend bedding that allows foraging, burrowing, digging, nest building and absorbs urine, ammonia, humidity and feces. Because autoclaved corncob is an efficient common bedding material used for the routine rearing of laboratory rodents, we next tested and confirmed in vitro that the amount of 'soiledness' influences the microbial selection of gut aerobes in autoclaved corncob bedding. Experimentally, three distinct fecal bacterial 'co-streaked' types from a healthy SPF-AKR mouse (shiny-spreading *Escherichia coli*, small gray *Lactobacillus murinus*, domed-white *Enterococcus faecalis* which inhibits *L. murinus* when in proximity) were added as a 1:1:1 mixture to housing system-Petri dishes containing either sterile clean bedding, GF-10-day-soiled bedding from a the housing system 10 of the present disclosure, a mixture of clean bedding containing 10% or 50% of the GF-soiled bedding (as surrogates for 1- and 5-day-soiled bedding based on mathematical model), or GF-diet. Remarkably, bacterial enumeration on TSA over time (23° C. for 9 days) demonstrated that each bedding condition result in very different bacterial growth ratio profiles (different from 1:1:1 inoculated ratio), favoring in most cases the enrichment/selection of *Enterococcus faecalis* in soiled cages. Intriguingly, plain GF-diet as growing substrate inhibited and disfavored the survival and growth of otherwise fast-growing *Escherichia coli* and *Lactobacillus murinus*, suggesting that certain types of (digested or indigested) diets might further favor bedding-enriched *Enterococcus faecalis*, arguably in the most proximal segments of the mouse gut (FIGS. 12a-f). With the abnormal abundance of *L. murinus* in experimental environments, it is reasonable to expect that such aerobic microbe could influence the mouse physiology, as it has been demonstrated that its overgrowth causes biotin-dependent alopecia in mice. On the other hand, the overgrowth *E. faecalis* can selectively inhibit a large number of other (mainly gram-positive) microbes via bacteriocin-like inhibitors greatly common amongst the family Enterococcaceae, within the order Lactobacillales.

From the above description of the present disclosure, those skilled in the art will perceive improvements, changes and modifications. Such improvements, changes, and modifications are within the skill of those in the art and are intended to be covered by the appended claims. All patents, patent applications, and publication cited herein are incorporated by reference in their entirety.

The invention claimed is:
1. A multilayer isolation housing system for life-long breeding, caring, and maintenance of germ-free or germ-specific organism colonies, the system comprising:
   a rack assembly having one or more internal dividing members;
   a plurality of housing units removably seated upon the one or more internal dividing members, wherein each housing unit comprises:
      an outer housing unit having a first removable cover that includes one or more openings to permit airflow therethrough, the first removable cover being seated atop the outer housing unit; and
      at least one inner housing unit nested inside of the outer housing unit, the at least one inner housing unit having a second removable cover that includes one or more openings to permit airflow therethrough, the second removable cover being seated atop the at least one inner housing unit;
   wherein the at least one inner housing unit is used to house the germ-free or germ-specific organism;

wherein each of the inner and outer housing units is free of mechanical ventilation, HEPA filtration, and pressurization.

2. The isolation housing system of claim 1, wherein each of the housing units is free of a food source and a water source.

3. The housing system of claim 1, wherein each of the outer housing unit and the at least one inner housing unit is made of a sterilizable material.

4. The housing system of claim 1, wherein:
the outer housing unit includes a plurality of walls that define the outer housing unit, at least one wall of the plurality of walls includes one or more openings to permit air flow therethrough; and the at least one inner housing unit includes a plurality of walls that define the at least one inner housing unit, at least one wall of the plurality of walls includes one or more openings to permit air flow therethrough.

5. The housing system of claim 4, wherein airflow through the at least one inner housing unit occurs only through the one or more openings of the at least one inner housing unit and airflow through the outer housing occurs only through the one or more openings of the outer housing unit.

6. The housing system of claim 1, further comprising:
a first filter that is directly connected to the first removable cover and arranged thereon so as to cover all of the one or more openings of the outer housing unit thereof; and
a second filter that is directly connected to the second removable cover and arranged thereon so as to cover all of the one or more openings of the at least one inner housing unit.

7. The housing system of claim 1, further comprising a sterilizable curtain connected to the rack assembly and being sized and dimensioned to drape over at least a portion of each of the housing units.

8. A multilayer isolation housing system for breeding and caring of germ-free or germ-specific organisms, the system consisting of:
a sterilizable rack assembly;
a plurality of housing units connected to the rack assembly, wherein each housing system unit comprises:
an outer housing unit having a first removable cover that includes one or more openings to permit airflow therethrough, the first removable cover being seated atop the outer housing unit;
at least one inner housing unit nested completely inside of the outer housing unit, the at least one inner housing unit having a second removable cover that includes one or more openings to permit airflow therethrough, the second removable cover being seated atop the at least one inner housing unit;
a first filter that is directly connected to the first removable cover and arranged thereon so as to cover all of the one or more openings of the outer housing unit thereof;
a second filter that is directly connected to the second removable cover and arranged thereon so as to cover all of the one or more openings of the at least one inner housing unit; and
a curtain connected to the rack assembly and being sized and dimensioned to drape over at least a portion of each of the housing units;
wherein each of the inner and outer housing units is free of mechanical ventilation, HEPA filtration, and pressurization.

9. The isolation housing system of any one of claims 1 and 8, wherein the first removable cover is positioned on any one of a plurality of walls of the outer housing unit and the second removable cover is positioned on any one of a plurality of walls of the at least one inner housing unit.

* * * * *